US010387228B2

United States Patent
Petrbok et al.

(10) Patent No.: US 10,387,228 B2
(45) Date of Patent: Aug. 20, 2019

(54) SYMMETRIC BRIDGE COMPONENT FOR COMMUNICATIONS BETWEEN KERNEL MODE AND USER MODE

(71) Applicant: CrowdStrike, Inc., Irvine, CA (US)

(72) Inventors: Milos Petrbok, Redmond, WA (US); Colin Christopher McCambridge, Minneapolis, MN (US)

(73) Assignee: CrowdStrike, Inc., Irvine, CA (US)

( * ) Notice: Subject to any disclaimer, the term of this patent is extended or adjusted under 35 U.S.C. 154(b) by 194 days.

(21) Appl. No.: 15/438,553

(22) Filed: Feb. 21, 2017

(65) Prior Publication Data
US 2018/0239657 A1   Aug. 23, 2018

(51) Int. Cl.
*G06F 9/54* (2006.01)
*G06F 9/44* (2018.01)
*G06F 13/14* (2006.01)
*G06F 21/52* (2013.01)

(52) U.S. Cl.
CPC ............. *G06F 9/546* (2013.01); *G06F 9/44* (2013.01); *G06F 9/541* (2013.01); *G06F 9/545* (2013.01); *G06F 13/14* (2013.01); *G06F 21/52* (2013.01)

(58) Field of Classification Search
CPC .................................. G06F 9/541; G06F 9/546
USPC .................................................. 719/313, 328
See application file for complete search history.

(56) References Cited

U.S. PATENT DOCUMENTS 5,355,498 A   10/1994   Provino et al.
6,009,274 A   12/1999   Fletcher et al.
6,052,723 A   4/2000    Ginn
6,088,804 A   7/2000    Hill et al.
6,463,584 B1  10/2002   Gard et al.
7,093,116 B2  8/2006    Chen et al.

(Continued)

FOREIGN PATENT DOCUMENTS

JP   2006065835   3/2006
JP   2006134307   5/2006

(Continued)

OTHER PUBLICATIONS

European Office Action dated Aug. 7, 2018, for European patent application No. 13808592.3, a counterpart foreign application of U.S. Pat. No. 9,292,881, 6 pgaes.

(Continued)

*Primary Examiner* — Andy Ho
(74) *Attorney, Agent, or Firm* — Lee & Hayes, P.C.

(57) ABSTRACT

A symmetric, cross-platform, bridge component is described herein. The bridge component creates an interface (through a set of application programming interfaces (APIs)) to enable the sending of data between a pair of components, called "endpoints," a first endpoint component of the pair being executed in a kernel mode of a computing device, and a second endpoint component of the pair being executed in a user mode of the computing device. A process for sending data between a kernel-level endpoint component and a user-level endpoint component executing on a computing device involves opening a communications port, setting the communications port to a connected state, and sending a message containing the data via the communications port. Data may be transmitted in this manner between the user mode and the kernel mode of the computing device in either direction.

21 Claims, 7 Drawing Sheets

(56) References Cited

U.S. PATENT DOCUMENTS

| | | | |
|---|---|---|---|
| 7,099,948 B2 | 8/2006 | Tormasov et al. | |
| 7,281,268 B2 | 10/2007 | Hollander et al. | |
| 7,366,891 B2 | 4/2008 | Khanna et al. | |
| 7,441,113 B2 | 10/2008 | Chong et al. | |
| 7,448,049 B1* | 11/2008 | Xing | G06F 9/54 |
| | | | 709/200 |
| 7,478,237 B2 | 1/2009 | Costea et al. | |
| 7,512,810 B1 | 3/2009 | Ryan | |
| 7,571,448 B1 | 8/2009 | Sallam | |
| 7,765,400 B2 | 7/2010 | Costea et al. | |
| 7,765,410 B2 | 7/2010 | Costea et al. | |
| 7,890,664 B1 | 2/2011 | Tao et al. | |
| 7,908,656 B1 | 3/2011 | Mu | |
| 8,065,728 B2 | 11/2011 | Wang et al. | |
| 8,086,836 B2 | 12/2011 | Chong et al. | |
| 8,190,868 B2 | 5/2012 | Schneider | |
| 8,220,041 B2 | 7/2012 | Boyce | |
| 8,234,693 B2 | 7/2012 | Stahl | |
| 8,239,947 B1 | 8/2012 | Glick | |
| 8,321,677 B2 | 11/2012 | Morten | |
| 8,407,279 B2 | 3/2013 | Kang | |
| 8,407,698 B2 | 3/2013 | Lee | |
| 8,413,261 B2 | 4/2013 | Nemoy et al. | |
| 8,510,570 B2 | 8/2013 | Smith et al. | |
| 8,533,830 B1 | 9/2013 | Dalcher | |
| 8,539,584 B2 | 9/2013 | Ramalingam | |
| 8,549,648 B2 | 10/2013 | Sallam | |
| 8,572,247 B2 | 10/2013 | Larson et al. | |
| 8,572,733 B1 | 10/2013 | Rockwood | |
| 8,577,616 B2 | 11/2013 | Dunlap | |
| 8,578,477 B1 | 11/2013 | Lin et al. | |
| 8,631,488 B2 | 1/2014 | Oz et al. | |
| 8,762,298 B1 | 6/2014 | Ranjan et al. | |
| 8,776,227 B1 | 7/2014 | Glick et al. | |
| 8,789,034 B1 | 7/2014 | Emelyanov et al. | |
| 9,038,176 B2 | 5/2015 | Sallam | |
| 9,043,903 B2 | 5/2015 | Diehl et al. | |
| 9,158,914 B2 | 10/2015 | Ionescu | |
| 9,292,881 B2 | 3/2016 | Alperovitch et al. | |
| 9,317,687 B2 | 4/2016 | Edwards et al. | |
| 9,571,453 B2 | 2/2017 | Diehl et al. | |
| 9,606,809 B2 | 3/2017 | Zhang | |
| 9,621,515 B2 | 4/2017 | Diehl et al. | |
| 9,858,626 B2 | 1/2018 | Alperovitch et al. | |
| 2001/0044904 A1 | 11/2001 | Berg et al. | |
| 2002/0023211 A1 | 2/2002 | Roth et al. | |
| 2003/0112781 A1 | 6/2003 | Kermode et al. | |
| 2004/0107416 A1 | 6/2004 | Buban et al. | |
| 2005/0159998 A1 | 7/2005 | Buyukkokten et al. | |
| 2006/0156380 A1 | 7/2006 | Gladstone et al. | |
| 2006/0174323 A1 | 8/2006 | Brown et al. | |
| 2007/0022287 A1 | 1/2007 | Beck et al. | |
| 2007/0094496 A1 | 4/2007 | Burtscher | |
| 2007/0143850 A1 | 6/2007 | Kraemer et al. | |
| 2007/0250817 A1 | 10/2007 | Boney | |
| 2008/0034429 A1 | 2/2008 | Schneider | |
| 2008/0126806 A1 | 5/2008 | Morten | |
| 2008/0189796 A1 | 8/2008 | Linn et al. | |
| 2008/0209505 A1 | 8/2008 | Ghai et al. | |
| 2008/0253287 A1 | 10/2008 | Gupta et al. | |
| 2008/0282198 A1 | 11/2008 | Brooks et al. | |
| 2008/0301669 A1 | 12/2008 | Rao et al. | |
| 2009/0070878 A1 | 3/2009 | Wang et al. | |
| 2009/0094039 A1 | 4/2009 | MacDonald et al. | |
| 2009/0119681 A1 | 5/2009 | Bhogal et al. | |
| 2009/0216806 A1 | 8/2009 | Feuerstein et al. | |
| 2009/0307142 A1 | 12/2009 | Mardikar | |
| 2010/0074446 A1 | 3/2010 | Fuchs et al. | |
| 2010/0169973 A1 | 7/2010 | Kim et al. | |
| 2010/0212012 A1 | 8/2010 | Touboul et al. | |
| 2010/0235622 A1 | 9/2010 | Robinton et al. | |
| 2010/0235879 A1 | 9/2010 | Burnside et al. | |
| 2010/0312890 A1 | 12/2010 | Bernosky | |
| 2011/0010522 A1* | 1/2011 | Abts | G06F 15/17375 |
| | | | 712/3 |
| 2011/0029772 A1 | 2/2011 | Fanton et al. | |
| 2011/0099632 A1 | 4/2011 | Beck et al. | |
| 2011/0145598 A1 | 6/2011 | Smith et al. | |
| 2011/0209219 A1 | 8/2011 | Zeitlin | |
| 2011/0239306 A1 | 9/2011 | Avni et al. | |
| 2012/0005542 A1 | 1/2012 | Petersen et al. | |
| 2012/0079594 A1 | 3/2012 | Jeong et al. | |
| 2012/0084799 A1 | 4/2012 | Sallam | |
| 2012/0167161 A1 | 6/2012 | Kim | |
| 2012/0246297 A1 | 9/2012 | Shanker et al. | |
| 2012/0255002 A1 | 10/2012 | Sallam | |
| 2012/0255012 A1 | 10/2012 | Sallam | |
| 2013/0145465 A1 | 6/2013 | Wang et al. | |
| 2013/0291112 A1 | 10/2013 | Shue et al. | |
| 2013/0305340 A1 | 11/2013 | Wotring | |
| 2013/0312095 A1 | 11/2013 | Edwards et al. | |
| 2013/0333040 A1 | 12/2013 | Diehl et al. | |
| 2014/0007190 A1 | 1/2014 | Alperovitch et al. | |
| 2014/0109226 A1 | 4/2014 | Diehl et al. | |
| 2014/0317405 A1 | 10/2014 | Johnson et al. | |
| 2015/0007316 A1 | 1/2015 | Ben-Shalom et al. | |
| 2015/0101044 A1 | 4/2015 | Martin et al. | |
| 2015/0128206 A1 | 5/2015 | Ben Haim et al. | |
| 2015/0178071 A1 | 6/2015 | Pavlik et al. | |
| 2015/0244679 A1 | 8/2015 | Diehl et al. | |
| 2015/0256552 A1 | 9/2015 | Lee et al. | |
| 2015/0268947 A1 | 9/2015 | Ionescu | |
| 2015/0326614 A1 | 11/2015 | Alperovitch et al. | |
| 2015/0356301 A1 | 12/2015 | Diehl et al. | |
| 2016/0170740 A1 | 6/2016 | Ionescu | |
| 2017/0061127 A1 | 3/2017 | Ionescu | |
| 2017/0109530 A1 | 4/2017 | Diehl et al. | |
| 2017/0213031 A1 | 7/2017 | Diehl et al. | |

FOREIGN PATENT DOCUMENTS

| | | |
|---|---|---|
| JP | 2008507757 | 3/2008 |
| JP | 2009238153 | 10/2009 |
| JP | 2010517164 | 5/2010 |
| JP | 2010182019 | 8/2010 |
| KR | 1020100085424 | 7/2010 |
| KR | 101038048 | 6/2011 |
| WO | WO2006023685 | 3/2006 |
| WO | WO2012107557 | 8/2012 |
| WO | WO2012135192 | 10/2012 |
| WO | WO2013164821 | 11/2013 |

OTHER PUBLICATIONS

IDG Communications, "Symantec adds New Protection Features to Its Conusmer and Enterprise Antivirus Solutions", Jan. 19, 2006, 5 pages.

Messmer, "Are all rootkits evil? Settlement in Sony CD case resurrects old debate.", retrieved on Aug. 11, 2018 from https://www.networld.com/article/2312244/lan-wan/are-all-rootkits-evil.html, May 23, 2006, 4 pages.

Office action for U.S. Appl. No. 15/051,461, dated Aug. 16, 2018, Ionescu, "Integrity Assurance and Rebootless Updating During Runtime", 11 pages.

Office action for U.S. Appl. No. 14/220,362, dated Aug. 23, 2018, Ionescu, "Integrity Assurance and Rebootless Updating During Runtime", 14 pages.

Australian Office Action dated Jan. 22, 2018 for Australian Patent Application No. 2013272198, a counterpart foreign application of U.S. Pat. No. 9,043,903, 5 pages.

Australian Office Action dated Nov. 30, 2017 for Australian patent application No. 2013281175, a counterpart foreign application of U.S. Pat. No. 9,292,881, 4 pages.

European Office Action dated Nov. 22, 2017 for European patent application No. 13800519.4, a counterpart foreign application of U.S. Pat. No. 9,043,903, 7 pgaes.

European Office Action dated Sep. 11, 2017 for European Patent Application No. 16179598.4, a counterpart foreign application of U.S. Appl. No. 14/810,840, 4 pages.

Extended European Search Report dated Jan. 22, 2018 for European Patent Application No. 15764091.3, 11 pages.

(56) References Cited

OTHER PUBLICATIONS

Partial Supplementary European Search Report dated Jan. 25, 2016 for European Patent Application No. 13808592.3, 6 pages.
Partial Supplementary European Search Report dated Oct. 12, 2017 for European Patent Application No. 15764091.3, 13 pages.
Supplementary European Search Report dated Nov. 3, 2015 for European Patent Application No. 13800519.4, 7 pages.
Extended European Search Report dated Dec. 6, 2016 for European patent application No. 16179598.4, 7 pages.
Supplementary Extended European Search Report dated Feb. 16, 2016 for European patent application No. 1380051934, 22 pages.
Extended European Search Report dated Jun. 2, 2016 for European patent application No. 13808592.3, 12 pages.
Translated Singapore Office Action dated Nov. 17, 2015 for Singapore patent application No. 11201408279Q, a counterpart foreign application of U.S. Appl. No. 13/538,439, 6 pages.
Translated Israeli Office Action dated Aug. 30, 2017 for Israeli patent application No. 235905, a counterpart foreign application of U.S. Pat. No. 9,043,903, 5 pages.
Israeli Office Action dated Sep. 11, 2017 for Israeli patent application No. 236390, a counterpart foreign application of U.S. Pat. No. 9,292,881, 7 pages.
Translated Japanese Office Action dated Mar. 21, 2017 for Japanese patent application No. 2015-520185, a counterpart foreign application of U.S. Pat. No. 9,292,881, 11 pages.
Translated Japanese Office Action dated Apr. 25, 2017 for Japanese Patent Application No 2015-516024, a counterpart foreign application of U.S. Pat. No. 9,043,903, 22 pages.
King et al, "Backtracking Intrusions", ACM SOSP, Oct. 2003, vol. 37, Issue 5, 14 pgs.
Final Office Action for U.S. Appl. No. 13/492,672, dated Oct. 23, 2014, David F. Diehl, "Kernel-Level Security Agent", 15 pages.
Office action for U.S. Appl. No. 15/393,797, dated Oct. 30, 2017, Diehl et al., "Security Agent", 10 pages.
Office Action for U.S. Appl. No. 15/051,461, dated Nov. 15, 2017, Ionescu, "Integrity Assurance and Rebootless Updating During Runtime", 9 pages.
Office Action for U.S. Appl. No. 14/810,840, dated Nov. 3, 2017, Ionescu, "Integrity Assurance Through Early Loading in the Boot Phase", 16 pages.
Office action for U.S. Appl. No. 14/220,362, dated Nov. 7, 2017, Ionescu, "Integrity Assurance and Rebootless Updating During Runtime", 16 pages.
Office action for U.S. Appl. No. 14/792,177, dated Dec. 16, 2016, Alperovitch et al., "Social Sharing of Security Information in a Group", 12 pages.
Final Office Action for U.S. Appl. No. 13/538,439, dated Dec. 2, 2014, Dmitri Alperovitch, "Social Sharing of Security Information in a Group", 13 pages.
Final Office Action for U.S. Appl. No. 13/728,746, dated Dec. 3, 2014, David F. Diehl, "Real-Time Representation of Security-Relevant System State", 22 pages.
Office action for U.S. Appl. No. 15/051,461, dated Dec. 8, 2016, Ionescu, "Integrity Assurance and Rebootless Updating During Runtime", 9 pages.
Office action for U.S. Appl. No. 14/709,779, dated Feb. 23, 2016, Diehl et al., "Kernel-Level Security Agent", 14 pages.
Office action for U.S. Appl. No. 14/220,362, dated Feb. 7, 2017, Ionescu, "Integrity Assurance and Rebootless Updating During Runtime", 16 pages.
Office Action for U.S. Appl. No. 13/728,746, dated Apr. 14, 2014, David F. Diehl, "Real-Time Representation of Security-Relevant System State", 17 pages.
Office action for U.S. Appl. No. 15/393,797, dated Apr. 18, 2017, Diehl et al., "Security Agent", 15 pages.
Office Action for U.S. Appl. No. 14/810,840, dated Apr. 20, 2017, Ionescu, "Integrity Assurance Through Early Loading in the Boot Phase", 12 pages.
Office Action for U.S. Appl. No. 13/538,439, dated Apr. 23, 2015, Dmitri Alperovitch, "Social Sharing of Security Information in a Group", 6 pages.
Office Action for U.S. Appl. No. 13/492,672, dated Apr. 7, 2014, David F. Diehl, "Kernel-Level Security Agent", 8 pages.
Office action for U.S. Appl. No. 14/140,323, dated May 11, 2016, Diehl et al., "Kernel-Level Security Agent", 15 pages.
Office action for U.S. Appl. No. 14/220,362, dated May 25, 2016, Ionescu, "Integrity Assurance and Rebootless Updating During Runtime", 12 pages.
Office action for U.S. Appl. No. 15/051,461, dated Jun. 1, 2017, Ionescu, "Integrity Assurance and Rebootless Updating During Runtime", 11 pages.
Office action for U.S. Appl. No. 14/792,177, dated Jun. 15, 2017, Alperovitch et al., "Social Sharing of Security Information in a Group", 14 pages.
Office Action for U.S. Appl. No. 15/483,153, dated Jun. 29, 2017, Diehl et al., "Kernel-Level Security Agent", 12 pages.
Office action for U.S. Appl. No. 13/538,439, dated Jun. 30, 2014, Alperovitch et al., "Social Sharing of Security Information in a Group", 13 pages.
Office action for U.S. Appl. No. 14/792,177, dated Jun. 30, 2016, Alperovitch et al., "Social Sharing of Security Information in a Group", 11 pages.
Office Action for U.S. Appl. No. 14/140,323, dated Jul. 31, 2015, David F. Diehl, "Kernel-Level Security Agent", 9 pages.
Office action for U.S. Appl. No. 14/709,779, dated Aug. 12, 2016, Diehl et al., "Kernel-Level Security Agent", 7 pages.
Office action for U.S. Appl. No. 14/220,362, dated Sep. 16, 2016, Ionescu, "Integrity Assurance and Rebootless Updating During Runtime", 14 pages.
PCT Search Report and Written Opinion dated Apr. 28, 2015 for PCT application No. PCT/US2015/013522, 11 pages.
PCT Search Report and Written Opinion dated Apr. 29, 2014 for PCT application No. PCT/US13/75856, 13 pages.
PCT Search Report and Written Opinion dated Jun. 1, 2015 for PCT application No. PCT/US2015/020187, 13 pages.
PCT Search Report dated Sep. 17, 2013 for PCT application No. , 12 pages.
PCT Search Report and Written Opinion dated Sep. 26, 2013 for PCT application No. PCT/US13/40428, 13 pages.
Popenko, S. et al., "Driver to Hide Processes and Files", CodeProject, Aug. 17, 2009.
Translated Singapore Office Action dated Sep. 28, 2015 for Singapore patent application No. 11201407292Q, a counterpart foreign application of U.S. Pat. No. 9,043,903, 6 pages.
Chiueh, et al, "Stealthy Deployment and Execution of In-Guest Kernel Agents", The Black Hat Technical Security Conference USA, 2009, pp. #1-pp. #12.
Extended European Search Report dated Jun. 15, 2018 for European Patent Application No. 18157955.8, 10 pages.
Graf, "Netlink Library (libnl)", retrieved on Jun. 5, 2018 at «https://www.infradead.org/~tgr/libnl/doc/core.html», May 9, 2011, 63 pages.
Translated Japanese Office Action dated Feb. 20, 2018 for Japanese Patent Application No. 2015-520185, a counterpart foreign application of U.S. Pat. No. 9,292,881, 9 pages.
Kaichuan, "Kernel Korner—Why and How to Use Netlink Socket", retrieved on Jun. 5, 2018 at «https://www.linuxjournal.com/article/7356», Jan. 5, 2015, pp. 1-13.
Neira-Ayuso, et al., "Communicating between the kernel and userspace in Linux using Netlink sockets", Software—Practice and Experience, vol. 40, No. 9, Aug. 1, 2010, Wiley Interscience, pp. 797-810.
Office action for U.S. Appl. No. 15/051,461, dated Mar. 15, 2018, Ionescu, "Integrity Assurance and Rebootless Updating During Runtime", 12 pages.
Japanese Office Action dated Jan. 8, 2019 for Japanese Patent Application No. 2017-177787, a counterpart of U.S. Pat. No. 9,043,903, 7 pages.

(56) References Cited

OTHER PUBLICATIONS

Final Office Action dated Jan. 18, 2019 for U.S. Appl. No. 15/051,461 "Integrity Assurance and Rebootless Updating During Runtime" Ionescu, 9 pages.

* cited by examiner

SYMMETRIC BRIDGE COMPONENT FOR COMMUNICATIONS BETWEEN KERNEL MODE AND USER MODE

BACKGROUND

In order to protect a host computing system against malicious software—often called "malware"—that can steal or destroy system resources, data, and private information, security software configured to guard against such threats is often implemented in both a kernel mode and a user mode of the host computing system. On at least some occasions, a kernel-level security component may need to send data to a user-level security component, or vice versa, such as to communicate events from one component to the other.

However, the code base for such security software— especially with respect to the source code for enabling communication between kernel-level and user-level components—can vary greatly depending on the type of operating system (OS) employed by the host computing system. This is at least partly due to different techniques used by different types of OS's for enabling communication between kernel-level and user-level components. For instance, some types of OS's load kernel-level components before loading user-level components, while other types of OS's load user-level components before loading kernel-level components, and the source code for allowing communication between kernel-level and user-level components typically must account for this loading order. This presents a problem because an OS-specific code base for security software must be implemented for each of the multiple available types of OS's on the market in order to enable communications between kernel-level and user-level security components.

Even for a given type of OS, the manner of communicating data from user mode to kernel mode may differ from the manner of communicating data in the opposite direction (i.e., from the kernel mode to the user mode). Thus, current systems, in addition to requiring an OS-specific code base for installed security software, must also implement a code base that is asymmetric, meaning different source code is used to enable communication of data from the kernel mode to the user mode, as compared to the source code that enables communication of data in the opposite direction (i.e., from the user mode to the kernel mode).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
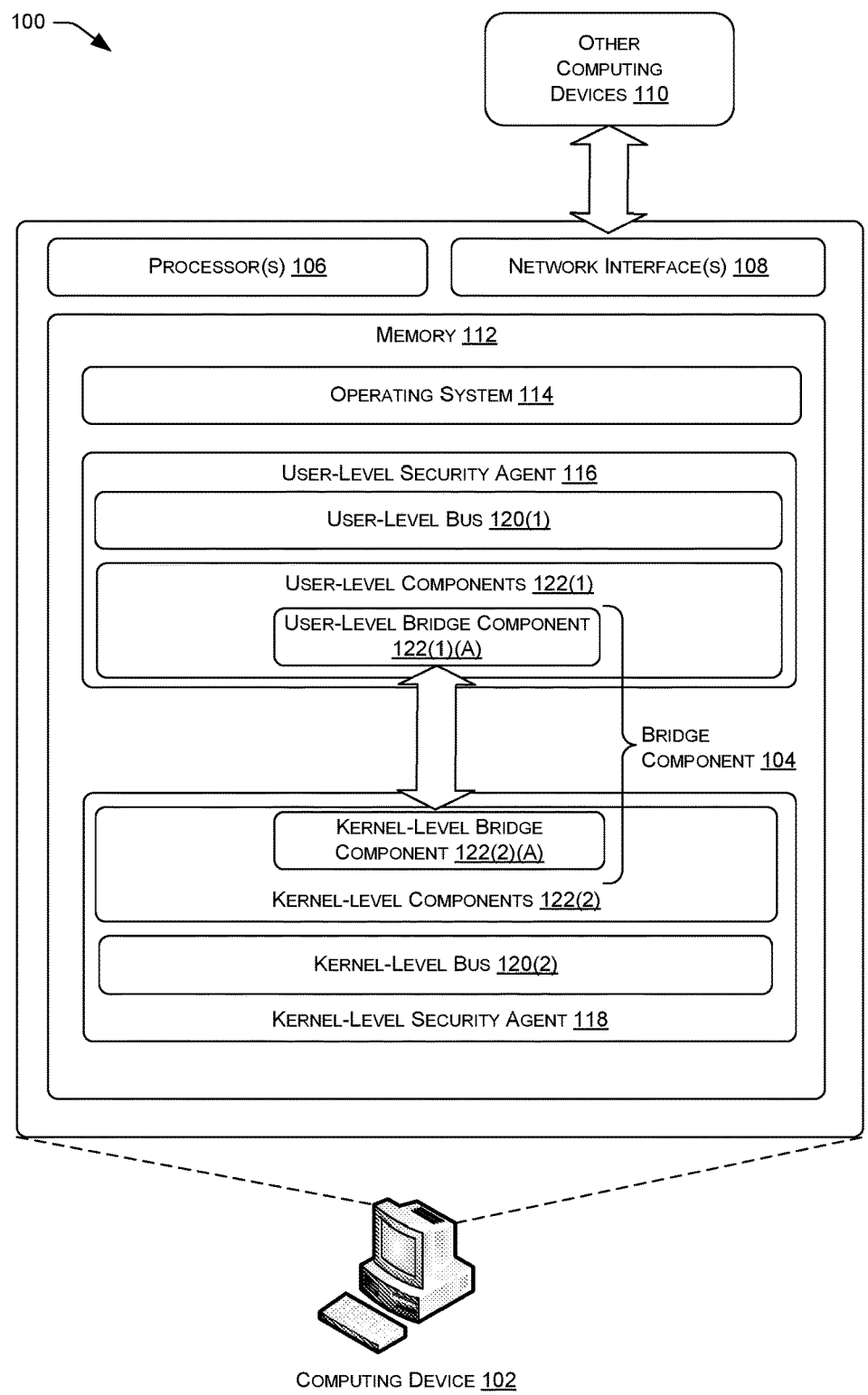
FIG. 1 illustrates an example computing device configured with a symmetric bridge component that enables communications between a kernel mode and a user mode of the computing device.

This disclosure describes, in part, a symmetric bridge component (often referred to herein simply as a "bridge component") that creates an interface to send data between a pair of components, called "endpoints" (or "endpoint components"), a first endpoint component of the pair being executed in a kernel mode of a computing device, and a second endpoint component of the pair being executed in a user mode of the computing device. Said another way, the symmetric bridge component represents logic for sending messages carrying data between user mode and kernel mode of the computing device on which the bridge component is implemented. In some embodiments the components that are involved in communicating data between the kernel mode and the user mode comprise security components that are part of an installed security software program on the computing device.

The symmetric bridge component, as its name implies, may be implemented partially in the user mode and partially in the kernel mode of the computing device, and may expose an application programming interface (API) that is symmetrical with respect to the user mode-kernel mode demarcation in the computing device. In other words, the bridge component allows its client components to avoid having to make any distinction between the user mode and the kernel mode of the computing device it is implemented on by exposing a common set of APIs for communication of data between kernel mode and user mode in both directions. In this sense, the bridge component functions introduces a standard messaging API in order to hide the complexity of any asymmetry created by the underlying operating system (OS) and/or mode (user mode or kernel mode). The bridge component also removes the requirement for consuming code to sequence startup operations between user mode components and kernel mode components.

The symmetric bridge component is also configured to be implementable on computing devices that employ any type of OS; the symmetric bridge component, in turn, exposes a cross-platform interface that does not vary across different types of OS's.

The symmetric bridge component includes a set of APIs for calling various functions to create, modify, and/or destroy objects, and/or to invoke methods on objects, which enables the sending of data between a kernel-level component and a user-level component executing on a computing device. Such objects may include, without limitation, communication ports, messages, and message buffers. In some implementations a process for sending data between a kernel-level component and a user-level component executing on a computing device involves opening a communications port for sending data originating from a first endpoint component to a second endpoint component. The first endpoint component can be executable in a kernel mode of the computing device, while the second endpoint component can be executable in a user mode of the computing device, or vice versa (i.e., communication of data can occur in both directions across the user mode-kernel mode demarcation). The opened communications port may then be set to a connected state, and in response to opening the communications port and setting the communications port to the connected state, the process may continue by sending a message containing the data originating from the first endpoint via the communications port, whereby the second endpoint may receive the data. In some embodiments, one of the endpoint components can be attached to a kernel-level bus of a kernel-level security agent executing in the kernel mode, while the other endpoint component can be attached to a user-level bus of a user-level security agent executing in the user mode.

Also disclosed herein are systems and devices comprising one or more processors and one or more memories, as well as non-transitory computer-readable media storing computer-executable instructions that, when executed, by one or more processors perform various acts and/or processes disclosed herein.

The symmetric and cross-platform characteristics of the bridge component described herein allow the bridge component to be implemented on any computing device that employs any type of OS. Therefore, the bridge component can be used to allow kernel-level and user-level components, such as security components, to communicate with each other, and the bridge component exposes an API, or a set of APIs, that can be utilized across various platforms. Furthermore, because the bridge component's exposed interface is agnostic to the order in which the components are loaded with respect to the user mode and the kernel mode of the computing device, the logic of client components using the bridge component can be simplified, as compared to logic that accounts for the loading order of components. This simplified interface between the user mode and the kernel mode of the computing device can be utilized for communicating security-related data (such as observed events) between the two modes, which can be vital for the efficacy of a related security program in guarding against threats from malware. Although many of the examples described herein describe endpoint components that are part of a security agent executing in either the kernel mode or the user mode, it is to be appreciated that the symmetric bridge component described herein is usable with any type of components, such as non-security related components, without changing the basic characteristics of the symmetric bridge component. Thus, the techniques and systems described herein can be extended outside of the security realm to allow communication between any pair of endpoint components, one component being in the user mode and the other component being in the kernel mode.

FIG. 1 illustrates an environment 100 including an example computing device 102 having implemented thereon a symmetric bridge component 104 (often referred to herein simply as a "bridge component 104") that enables communications between a kernel mode and a user mode of the computing device 102. In various embodiments, the computing device 102 may be, or include, a server or server farm, multiple, distributed server farms, a mainframe, a work station, a personal computer (PC), a laptop computer, a tablet computer, a personal digital assistant (PDA), a cellular phone, a media center, an embedded system, or any other sort of computing device or devices. In some implementations, the computing device 102 represents one or more virtual machines implemented on one or more computing devices.

The computing device 102 may include one or more processors 106 and one or more network interfaces 108. The processor(s) 106 may be, or include, any sort of processing unit, such as a central processing unit (CPU) and/or a graphic processing unit (GPU). The network interface(s) 108 allow the computing device 102 to communicate with one or more other computing devices 110. In some embodiments, the other computing device(s) 110 can represent a remote security system, such as a security service implemented in the "Cloud" on a set of remotely located devices that provide security services to the computing device 102. For example, a remote security system may receive notifications of observed events from the computing device 102, may perform analysis of data associated with those events, may perform healing of the computing device 102, and may generate configuration updates and provide those updates to the computing device 102. These interactions between the computing device 102 and the remote security system enable, among other things, a detection loop aimed at defeating a malware update loop of malware developers (also referred to as "adversaries").

The network interface(s) 108 may send and receive communications through one or more networks, and may support both wired and wireless connection. Such network(s) may be include, without limitation, wired networks, wireless networks, and combinations of wired and wireless networks, any one or combination of multiple different types of public or private networks (e.g., cable networks, the Internet, wireless networks, etc.). In some instances, the computing device 102 is configured to communicate via the network interface(s) 108 using a secure protocol (e.g., https) and/or any other protocol or set of protocols, such as the transmission control protocol/Internet protocol (TCP/IP).

The computing device 102 may include non-transitory computer-readable memory 112, which may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The computing device 102 may implement an operating system (OS) 114, as well as a user-level security agent 116, and a kernel-level security agent 118, each being shown stored in the memory 112 and executable by the processor(s) 106. The user-level security agent 116 and the kernel-level security agent 118 may represent at least a portion of a security program installed on the computing device 102. In some embodiments, at least the kernel-level security agent 118 may load before the OS 114 of the computing device 102, sometimes very early in the boot-time of the computing device 102, such as by some of the first few dozen instructions. In some embodiments, either or both of the kernel-level security agent 118 and/or the user-level security agent 116 are installed on the computing device 102 in the form of a driver and may be received from a remote security service, as described herein.

As shown in FIG. 1, the user-level security agent 116 may include a user-level bus 120(1), and one or more user-level components 122(1) attached to the user-level bus 120(1). At least one of the user-level components 122(1) includes a user-level bridge component 122(1)(A) that is part of the symmetric bridge component 104 executed in the user mode of the computing device 102.

The kernel-level security agent 118 may include a kernel-level bus 120(2), and one or more kernel-level components 122(2) attached to the kernel-level bus 120(2). At least one of the kernel-level components 122(2) includes a kernel-level bridge component 122(2)(A) that is part of the symmetric bridge component 104 executed in the kernel mode of the computing device 102.

In general, the components 122 of both the user-level security agent 116 and the kernel-level security agent 118 may be configured to observe events and determine actions to take based on those events, potentially with the assistance of a remote security service. In addition, the OS 114 may include hooks or filter drivers that allow other processes, such as the user-level security agent 116 and/or the kernel-level security agent 118 to receive notifications of the occurrence or non-occurrence of events such as, without limitation, file creates, reads and writes, launching of executables, or events that occur in the user mode of the computing device 102, such as, without limitation, rendering of display graphics for display on a display screen of the computing device 102, etc. For example, at least some of the components 122 may include "collectors" that receive notifications of semantically-interesting events (e.g., file writes and launching executables) from the OS's 114 hooks or filter drivers, from user-mode event monitors, kernel-mode event monitors, and/or from threads monitoring log files or memory locations. Other of the components 122 may include "correlators" that note the fact of the occurrence of events, sometimes after filtering the semantically-interesting events down to a subset of events. Yet other of the components 122 may include "actors" that may, among other things, gather forensic data associated with an event and update a situational model of the user-mode security agent 116 and/or the kernel-level security agent 118 with the forensic data. Such a situational model can represent chains of execution activities and genealogies of processes, tracking attributes, behaviors, or patterns of processes executing on the computing device 102, enabling an "event consumer" component 122 to determine when an event is interesting from a security standpoint. Events may include both actions performed by processes and non-occurrence of expected actions. For example, a collector component 122 may register with a hook or filter driver offered by the OS 114 to receive notifications of the occurrence or non-occurrence of certain events, such as file creates, reads and writes, and loading executables.

In some instances, the computing device 102, or any sub-components thereof, may have features or functionality in addition to those that FIG. 1 illustrates. For example, the computing device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the computing device 102 may reside remotely from the computing device 102, in some implementations.

Figure 2:
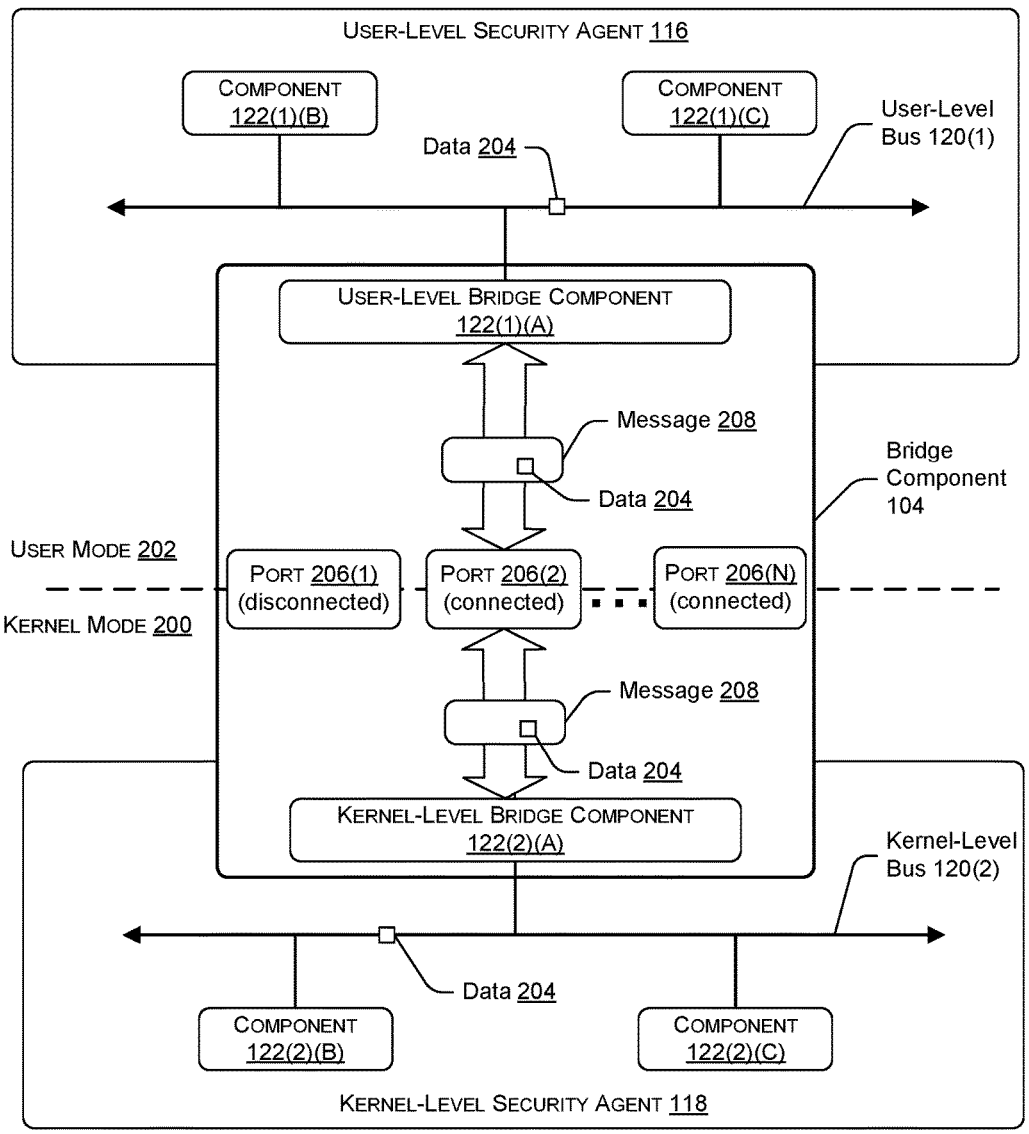
FIG. 2 illustrates a more detailed, example architecture of the symmetric bridge component of FIG. 1 that allows for communication between components of a user-level security agent a kernel-level security agent.

FIG. 2 illustrates a more detailed, example architecture of the symmetric bridge component 104 of FIG. 1, in use with the user-level security agent 116 and the kernel-level security agent 118. As illustrated, the kernel-level security agent 118 is executed in a kernel mode 200 of the computing device 102, while the user-level security agent 116 is executed in a user mode 202 of the computing device 102. The kernel mode 200 and user mode 202 correspond to protection domains—also known as rings—that protect data and functionality of the computing device 102 from faults and malware. Typically, a user mode, such as user mode 202, is associated with the outermost ring and the least level of privileges to access memory and functionality. This ring is often referred to as "ring 3" and includes many application processes. A kernel mode, such as kernel mode 200, is associated with an inner ring (sometimes the innermost ring, although in modern computing devices there is sometimes an additional level of privilege, a "ring −1") and a higher level of privileges to access memory and functionality. This ring is often referred to as "ring 0" and typically includes operating system (OS) 114 processes.

Each of the buses 120 of the respective security agents 116 and 118 represents a delivery vehicle that, within its respective "mode" (i.e., user mode 202 or kernel mode 200) facilitates the routing or delivery of events between different components 122 attached to the bus 120. In some instances, it may be useful for a user-level component 122(1) to send data 204 (e.g., data associated with an event) to a kernel-level component 122(2), or vice versa. Because the user-level bus 120(1) and the kernel-level bus 120(2) are individually unaware of the other bus's existence, the symmetric bridge component 104 can be utilized to enable the communication of data 204 between respective components 122 attached to the kernel-level bus 120(2) and the user-level bus 120(1). It is to be appreciated that the "buses" 120 represent one exemplary type of component that can be instantiated in each of the respective modes, and that other types of components or mechanisms are contemplated in lieu of using a "bus". For instance, the functions of the buses 120 described herein can, in some implementations, be carried out by one or more of the components 122, without the use of a bus.

As mentioned, the symmetric bridge component 104 includes a set of application programming interfaces (APIs) for calling various functions to create, modify, and/or destroy objects, and/or to invoke methods on objects, which facilitates the sending of data 204 between a kernel-level component 122(2) and a user-level component 122(1). Such objects may include, without limitation, communication ports 206(1), 206(2), . . . , 206(N) (collectively 206), and messages 208. As used herein, components 122 exchanging data 204 via communication ports 206 are called "endpoints" or "endpoint components." For example, a first endpoint component 122(2)(B) of the kernel-level security agent 118 may provide data 204 on the kernel-level bus 120(2) to which the component 122(2)(B) is attached. This data 204 can represent any suitable data, such as data associated with an event that is to be consumed (or otherwise received) by one or more other components 122. The consumer components 122 may include one or more components 122(2) of the kernel-level security agent 118 and/or one or more components 122(1) of the user-level security agent 116. In some embodiments, the kernel-level bridge component 122(2)(A) may be configured to detect data 204 that is to be sent to a user-level component 122(1). The kernel-level bridge component 122(2)(A) may observe all data 204 provided on the kernel-level bus 120(2) and a configuration may specify one or more criteria for sending particular data 204 (e.g., data 204 associated with particular events that satisfy the criteria) to the user-level components 122(1).

Before data 204 originating from the first endpoint component 122(2)(B) in the kernel mode 200 can be communicated to a second endpoint component 122(1)(C) in the user mode 202 a communications port 206, such as the communications port 206(2), is to be opened and connected by the bridge component 104 (and/or by endpoints 122 utilizing the bridge component 104), and this communication port 206(2) acts as a communication medium to communicate the data 204 between the endpoints 122(2)(B) and 122(1)(C). As shown in FIG. 2, an opened port 206 can be in a disconnected state or a connected state. For example, the port 206(1), although opened, is shown as being in the disconnected state, whereas the ports 206(2) and 206(N) are shown as being in the connected state. Messages 208 can be passed over a communications port 206 that is set to the connected state, while messages 208 cannot be passed over a communications port 206 that is set to the disconnected state. A communications port 206, such as the communication port 206(2), is configured to facilitate the exchange of data 204 (e.g., simple buffers) between two endpoint components 122 (one endpoint component 122(1) in the user mode 202, and the other endpoint component 122(2) in the kernel mode 200). In some embodiments, a communication port 206 supports a 1-1 communication between endpoints 122, rather than a 1-many or many-1 communication. Of course, a communications port 206 can facilitate communication in either direction across the user mode-kernel mode demarcation, such that the data 204 can originate from a first endpoint component 122(1) in the user mode 202 and can be received by a second endpoint component 122(2) in the kernel mode 200, or vice versa. Because the bridge component 104 exposes a symmetric interface, the descriptions herein that describe sending data 204 between endpoints 122 in a particular direction across the user mode-kernel mode demarcation also apply to sending data 204 in the opposite direction.

Opening a port 206: Either of the bridge components 122(1)(A) or 122(2)(A) (or an endpoint 122 utilizing the bridge component 104) can initiate the opening of a communications port 206 by calling a particular "port opening" function to invoke or activate the function. An example Function (1), suitable for opening a communications port 206, is shown below:

```
typedef LONGLONG CS_PORT, *PCS_PORT;
NTSTATUS
CsPortOpen (
  _out PCS_PORT Port,
  _in CS_PORT_ID PortId,
  _in_opt ULONG_PTR PortContext,
  _in PCS_CONNECT_CALLBACK ConnectCallback,
  _in PCS_MESSAGE_SENT_CALLBACK
    MessageSentCallback
);
```
(1)

In Function (1), "Port" represents a returned port handle that can be used for send and receive operations via the port 206; "PortID" supplies the port identifier of the port 206 to be opened; "PortContext" is an optional context provided to the callbacks associated with the port 206; "ConnectCallback" is a callback provided by the caller (e.g., the bridge component 122(1)(A) or 122(2)(A), or the endpoint 122 utilizing the bridge component 104), and the "ConnectCallback" function is activated in response to a port 206 being set to the connected state (see below for more detail); and "MessageSentCallback" is a callback provided by the caller (e.g., the bridge component 122(1)(A) or 122(2)(A), or the endpoint 122 utilizing the bridge component 104) that is activated in response to a queued message 208 (described in more detail below) being sent, timing out, or failing to send.

The port identifier of the port 206 that is assigned in response to activating Function (1) may comprise a unique identifier of the port 206 that differentiates the port 206 from other communications ports 206 that have been opened via activation of Function (1). For example, the communications port 206(2) may have a port identifier that is unique with respect to the port identifiers of all of the other ports 206(1) and 206(3)-(N) that have been opened by the bridge component 104. Accordingly, the port, identifier of a given port 206, such as the port 206(2), uniquely identifies a communication relationship between two endpoint components 122 across the user mode-kernel mode demarcation, such as a relationship between a first endpoint component 122(2)(B) in the kernel mode 200 and a second endpoint component 122(1)(C) in the user mode 202. This design allows an endpoint component 122 to use multiple port identifiers, as needed, to avoid complexity of multiplexing unrelated communication streams over a single port 206. For instance, a first port identifier of a first port 206(1) can be used by a component 122(2)(B) for a first application, and a second port identifier of a second port 206(2) can be used by the same component 122(2)(B) for a second application. In addition, use of a given port identifier can be restricted to use by no more than two endpoint components 122 (one being a kernel-level component 122(2) and one being a user-level component 122(1)) at the given time, notwithstanding the fact that multiple threads managed by the same endpoint component 122 can concurrently access the same port 206 having a particular port identifier. In some embodiments, the unique port identifier of a given port 206, such as the port 206(2), is predetermined (e.g., pre-shared knowledge) for both endpoint components 122 that are to communicate via the port 206(2). For instance, the port identifier of the port 206(2) can be predetermined by selecting the port identifier at compile time for a given pair of endpoint components 122, by communicating the port identifier through an out-of-band mechanism to the pair of endpoint components 122. (or to the bridge components 122(1)(A) and 122(2)(A)), or any other suitable mechanism for predetermining the port identifier. In some embodiments, a given port identifier is not reused for a duration of a single system boot (i.e., is not reused until the next system boot).

The call of Function (1), above, can return with multiple possible return codes including, without limitation, a "STATUS_SUCCESS" return code, and an error code, the error code being returned in all other cases besides the "STATUS_SUCCESS" return code. The "STATUS_SUCCESS" return code indicates that the communications port 206 has been initialized from the calling side. For example, if the kernel-level bridge component 122(2)(A) (or an endpoint 122(2) utilizing the bridge component 104) called Function (1) to request that the communications port 206(2) be opened, a return code of "STATUS_SUCCESS" indicates that the port 206(2) has been initialized from the kernel mode 200. Likewise, if the user-level bridge component 122(1)(A) (or an endpoint 122(1) utilizing the bridge component 104) called Function (1), and "STATUS_SUCCESS" was returned, this would indicate that the port 206(2) has been initialized from the user mode 202. The "STATUS_SUCCESS" return code can also indicate that the port 206 has been set to a "waiting state" until Function (1) is activated from the other side of the user mode-kernel mode demarcation.

Connecting a port 206: A port 206 can be set to a connected state in response to both of the bridge components 122(1)(A) and 122(2)(A) (or a pair of endpoints 122(1) and 122(2) utilizing the bridge component 104) having called Function (1), which invokes the "ConnectCallback" function, as introduced with reference to Function (1). This "ConnectCallback" function is invoked/activated each time a port 206 is set to the connected state. For instance, port 206(2) may have been initialized by the kernel-level bridge component 122(2)(A) (or a kernel-level endpoint 122(2)) utilizing the bridge component 104) having activated Function (1) before the user-level bridge component 122(1)(A) (or a user-level endpoint 122(1)) activates Function (1) from the user mode 202, thereby placing the port 206(2) in a "waiting state" and/or an opened, but disconnected state. At this point in time, the return code of Function (1) can be provided to the kernel-level bridge component 122(2)(A) (or the corresponding kernel-level endpoint 122(2)) to open the port 206(2), yet the port 206(2) will not be set to the connected state until a later point in time when the user-level bridge component 122(1)(A) (or the corresponding user-level endpoint 122(1)) activates Function (1) in the user mode 202. In response to this second activation of Function (1) in the user mode 202 (the first activation of Function (1) having previously occurred in the kernel mode 200), the port 206(2) can be set to the connected state. It is to be appreciated that, in this scenario, the "ConnectCallback" function may be invoked/activated before a return code of Function (1) is received by the user-level bridge component 122(1)(A) (or by the corresponding user-level endpoint 122(1)) because the kernel-level bridge component 122(2)(A) (or the corresponding kernel-level endpoint 122(2)) has already opened the port 206(2) and set the port 206(2) to the waiting state. It is also to be appreciated that the "ConnectCallback" function may be invoked in the same thread context as the thread context in which the port 206 was opened if the port 206(2) has already been opened from the other side (i.e., the user mode 202 or the kernel mode 200) when the calling component 122 activates Function (1), or the "ConnectCallback" function may be invoked in a different thread context than the thread context in which Function (1) was called, such as when the port 206(2) is opened from the other side before a return code of Function (1) is received by the calling bridge component 122(1)(A) or 122(2)(A) (or by the corresponding endpoint 122).

It is to be appreciated that a port 206 is opened and connected in a symmetric fashion with respect to both the user mode 202 and kernel mode 200. This enables the bridge component 104 to be implemented on computing devices 102 that employ different types of OS's 114, which may load or initialize components in different orders with respect to whether the components are in the user mode 202 or the kernel mode 200. For example, some types of OS's 114 load components 122(2) in kernel mode 200 before the components 122(1) in user mode 202 are loaded, while other types of OS's 114 load components 122(1) in user mode 202 before the components 122(2) in kernel mode 200 are loaded.

An example of the aforementioned "ConnectCallback" function, suitable for setting a communications port 206 to a connected state, is shown below as Function (2):

```
typedef
VOID
(*PCS_CONNECT_CALLBACK) (
    _in CS_PORT Port,
    _in CS_PORT_ID PortId,
    _in_opt ULONG_PTR PortContext
);
```
(2)

In Function (2), "Port" is the port handle retrieved by the Function (1) call; "PortID" is the port identifier of the port 206 supplied in the corresponding Function (1) call; "PortContext" is an optional opaque value defined by the calling endpoint 122 and provided by the calling component 122 of Function (1).

Closing a port 206: A port 206 can be closed at any time by either endpoint 122 of a pair of endpoints 122 (one being in user mode 202, and the other being in kernel mode 200). An endpoint 122 can be informed that the other endpoint 122 has closed the port 206 (causing the port 206 to be set to the disconnected state) at the next invocation of a communication operation (e.g., Send, Queue, Receive) on the closed port 206. Such a communication call will return an appropriate error code (e.g. STATUS_CONNECTION_DISCONNECTED) to inform the caller (e.g., the endpoint 122, or the bridge component 122(1)(A) or 122(2)(A) utilized by the endpoint 122) that the port 206 is disconnected. An endpoint 122 may close its own side of the port 206 by invoking the example Function (3), shown below:

```
NTSTATUS
CsPortClose (
    _In_ CS_PORT Port
);
```
(3)

In Function (3), "Port" is an input parameter that corresponds to a previous invocation/activation of Function (1). The call of Function (3), above, can return with multiple possible return codes including, without limitation, a "STATUS_SUCCESS" return code, and an error code. The "STATUS_SUCCESS" return code indicates that the port 206 has been closed, and all pending operations or callbacks are complete or cancelled. The error code may indicate that the port 206 was not closed successfully, e.g. if the "Port" parameter of Function (3) is invalid. In response to closing the port 206, resources associated with the closed port 206 can be freed, and any racing callbacks on the port 206 can be finished.

Sending Data: Data 204 that is to be sent from a first endpoint 122, such as the kernel-level endpoint 122(2)(B), to a second endpoint 122, such as the user-level component 122(1)(C), can be sent in a message 208 via the bridge component 104, as shown in FIG. 2. The data 204 may also be serialized as serialized data to create the message 208 for sending across the user mode-kernel mode demarcation. The serialized data can include a message buffer having a starting address and a length. In order to send a message 208, a function can be activated that specifies the starting address and the length of the message buffer 208. Before describing such message sending functions in more detail, concepts relating to the identification, ordering, and queuing of messages will be discussed, as well as management of serialized data, such as message buffers.

Message identification: Individual messages 208 can be assigned a unique message identifier. These message identifiers can be unique with respect to all messages 208 sent across a given port 206, such as the port 206(2), by a given endpoint 122. These message identifiers can also be assigned in a sequential, though asynchronous, fashion. However, in the case of asynchronous assignment of message identifiers, message identifiers may not represent the order that messages 208 are received by the bridge component 104, nor the order of delivery across the bridge component 104 to the other endpoint 122.

Because a message identifier may be assigned automatically to every message 208, the message identifier can be made available for use by an endpoint component 122 to uniquely represent an individual instance of a message 208. Furthermore, the message identifier of a given message 208 can be communicated across a port 206 so that both endpoints 122 (one being in the user mode 202, and the other being in the kernel mode 200) receive the unique message identifier for a given message 208. The message identifier can therefore be made available for use by a pair of endpoints 122 (one being in the user mode 202, and the other being in the kernel mode 200) to correlate messages 208 in a more complex protocol. It is to be appreciated that a particular message identifier is unique for a given port 206, such as the port 206(2), and a given endpoint 122, such as the kernel-level endpoint 122(2)(B). Furthermore, two different ports 206 (e.g., the ports 206(1) and 206(2), with corresponding different port identifiers) can generate overlapping message identifiers with respect to each other, and, likewise, a pair of endpoints 122 on a single port 206 (one endpoint 122(1) being in user mode 202, and the other endpoint 122(2) being in kernel mode 200) can generate overlapping message identifiers with respect to each other. It is also to be appreciated that a set of valid message identifiers may exclude the value 0. In addition, messages 208 can be assigned a message identifier regardless of whether the message 208 is actually delivered to a receiving endpoint 122, or whether the message times out without being delivered.

Message ordering: As will be described in more detail below, messages 208 can be sent by activating a synchronous function or an asynchronous function. With regard to the synchronous function, non-overlapping synchronous messages 208 can be delivered in order, with increasing message identifiers. For example, if an endpoint 122 calls the synchronous function (described in more detail below) to send a first synchronous message 208(1), waits for the call to return, and then calls the synchronous function to send a second synchronous message 208(2), the second message 208(2) can be sent after the first message 208(1), and the second message 208(2) can have a strictly greater message identifier value than the message identifier value of the first message 208(1). Again, with regard to the synchronous function, uninterrupted, non-overlapping synchronous messages 208 can be assigned sequentially increasing message identifiers. For example, if all messages 208 from a given endpoint 122 are delivered successfully, and the endpoint 122 performs no other send or queue activity on a given port 206 over which the messages 208 were successfully sent, then the message identifiers assigned to a sequence of non-overlapping invocations of the synchronous function can be sequentially increasing message identifiers (e.g., k, k+1, k+2, . . . ) in addition to being delivered in order with increasing message identifiers. Thus, an endpoint 122 can perform its own synchronization to ensure that a subsequent message 208(2) is not sent until the previous cull of the synchronous function to send a previous message 208(1) has completed successfully (e.g., a return code indicating successful sending of the previous message 208(1) is received). Such synchronization can be accomplished, for example, by sending all sequenced messages 208 from a single thread, by using a synchronization primitive (e.g., a lock) to ensure exclusive access to the port 206 in a multi-threaded sequenced scenario.

It is to be appreciated that two or more messages 208 sent via overlapping calls of the synchronous function to send messages 208 may not be delivered in any particular delivery order, nor have any particular message identifier order. It is also to be appreciated that messages 208 queued in response to calls of an asynchronous function to send messages 208 may not be delivered in any particular delivery order, nor have any particular message identifier order with respect to messages 208 sent in response to calls of the synchronous function to send messages 208, nor with the other messages 208 queued in response to calls of the asynchronous function to send messages. The fact that messages 208 may be queued in a particular order does not mean that these messages 208 will be delivered in the same order in which they were queued, nor that the message identifiers of these messages 208 will be assigned in the same order in which they were queued. It is also to be appreciated that there may not be a correlation between the delivery order of messages 208 and the assigned message identifiers of those messages 208, except in the case of the messages 208 being sent by uninterrupted, non-overlapped calls to the synchronous function for sending messages 208.

Message queuing: As mentioned above, and described in more detail below, the bridge component 104 can be configured to support a multithreaded asynchronous message 208 communication framework. Thus, an API with a registered asynchronous function for sending messages can allow for deferred communication by queuing a message 208, and subsequently sending the message 208 in a different thread context than a thread context in which the message 208 was queued. This is in contrast to an alternative synchronous function for sending messages 208 that can also be called for sending messages synchronously, without queuing the messages 208.

In the asynchronous, message queuing scenario, it is to be appreciated that message identifiers will not necessarily be assigned at the time a message 208 enters bridge component 104 subsystem, and will instead be reported to the calling endpoint 122 (or bridge component 122(1)(A) or 122(2)(A)) used by the endpoint 122) later with the "MessageSentCallback," which is the callback introduced with reference to Function (1). Recall that the "MessageSentCallback" is invoked/activated whenever a queued message 208 is sent, times out, or fails to send, and this callback may be received on some other thread context before the asynchronous function returns in the enqueuing thread's context. Furthermore, a unique queued message identifier can be assigned to a queued message 208, the queued message identifier being unique for a given port 206. This queued message identifier can be used to correlate queued messages 208 to their callbacks (e.g., the "MessageSentCallback"), as well as to cancel a queued message(s) 208. An endpoint 122 may pre-allocate such a queued message identifier by calling a function, such as "CsPortGetUniqueQueuedMessageId" in order to ease programming of the inherent race condition in the "MessageSentCallback." This pre-allocation of a queued message identifier allows the endpoint 122 to pre-populate any required correlation data structures in anticipation of callbacks overlapping the enqueue operation.

Buffer management: As mentioned above, data 204 can be serialized as serialized data to create a message 208. Such serialized data can include a message buffer having a starting address and a length. In some embodiments, messages 208 carry a payload of an array of bytes. A message buffer, as passed among APIs of the bridge component 104, can begin with extra space for a header, and the contents of the header can be opaque (i.e., unknown) to the sender and receiver of the message 208. The size of such a header may be determined by calling an API. An endpoint 122 (or a bridge component 122(1)(A) or 122(2)(A) utilized by the endpoint 122) can allocate a message buffer using the following example pseudo code:

```
std::uint32_t payloadLength = ...;
// Allocate message buffer with space for Header
std::uint32_t HeaderLength = Port->GetHeaderSize( );
std::uint32_t messageLength = HeaderLength + payloadLength;
unsigned char* messageBuffer = new (std::nothrow) unsigned char[messageLength];
unsigned char* payload = messageBuffer + HeaderLength;
// Fill in payload...
// Send message
MESSAGE_ID messageId;
NTSTATUS status = Port->SendMessage(messageBuffer,
messageLength,
timeoutSeconds * 1000, &messageId);
```

A maximum size of the message 208 (Header and payload) may be constrained or limited by OS-specific constrains, a priori knowledge of a given pair of endpoints 122 communicating data 204 with each other via the message 208, or other possible constraints. For example, for a particular port 206 (i.e., a particular port identifier), the pair of endpoints 122 utilizing the particular port 206 may agree (e.g., through an out-of-band mechanism) that the maximum message 208 payload size will be 64 bytes, and, therefore, 64-byte buffers can be utilized throughout the API set without encountering errors.

In regards to buffer lifetimes, it is to be appreciated that, when sending a message 208 by calling the synchronous function, the lifetime of the message buffer of the sending endpoint 122 can extend at least until the call of the synchronous function returns, such as when the message 208 is successfully sent, a timeout occurs before the message 208 can be sent, or the message 208 failed to send (e.g., if the port 206 is in the disconnected state during the attempt to send the message 208). In other words, the message buffer of the message 208 can remain valid and unchanged at least until the call of the synchronous function returns with one of the above status indicators. When sending a message 208 by calling the asynchronous function, the lifetime of the message buffer of the sending endpoint 122 can extend at least until a "MessageSentCallback" is called with a queued message identifier corresponding to the message 208 in question. This "MessageSentCallback" can be activated when the message 208 is successfully sent, a timeout occurs before the message 208 can be sent, or the message 208 failed to send (e.g., if the port 206 is in the disconnected state during the attempt to send the message 208).

The processes described herein are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3A:
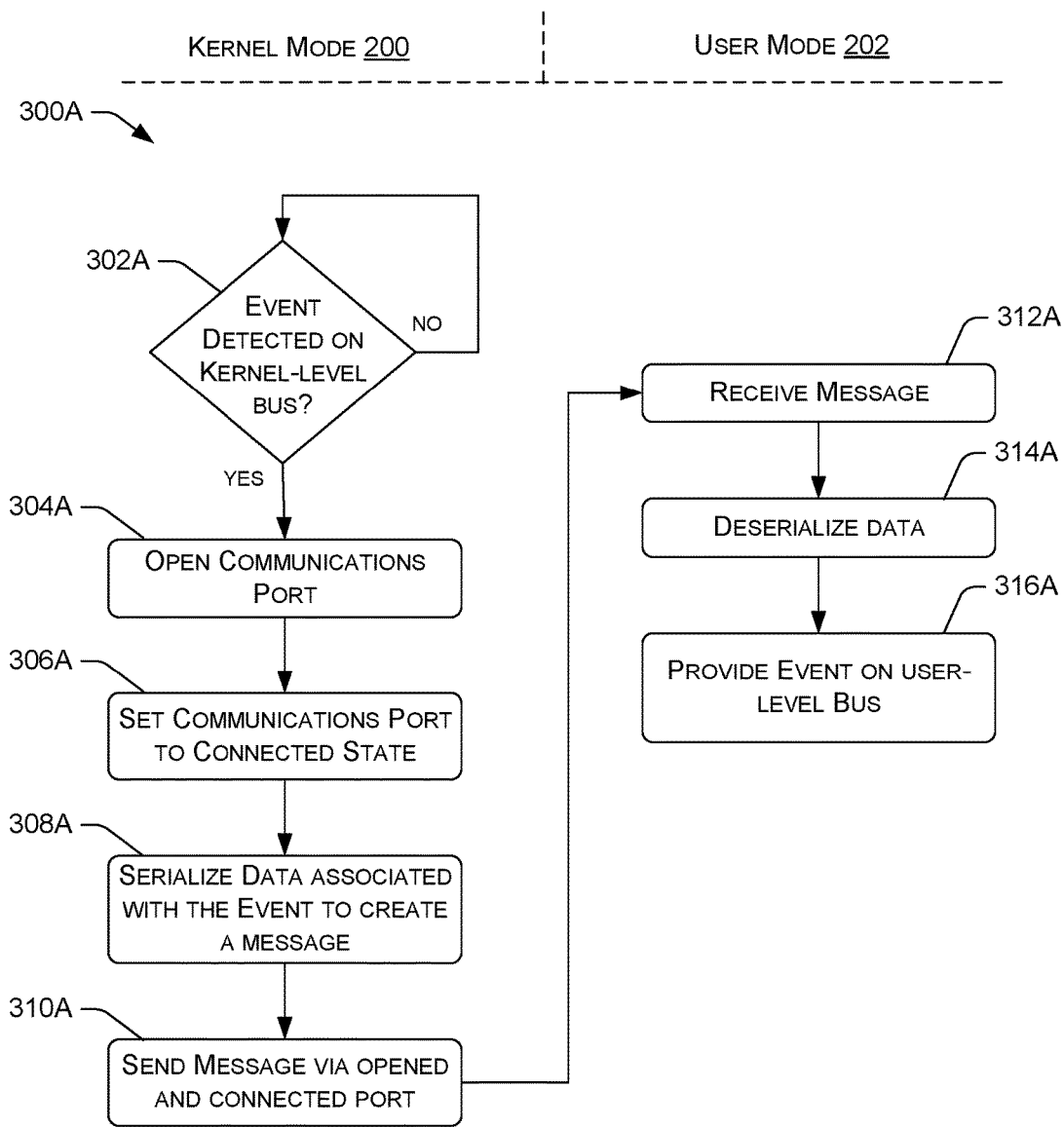
FIG. 3A illustrates example process for sending data between a kernel-level component and a user-level component in a direction from the kernel mode to the user mode.

FIG. 3A illustrates example process 300A for sending data 204 between a kernel-level component 122 and a user-level component 122 in a direction from the kernel mode 200 to the user mode 202. For illustrative purposes, the process 300A is described with reference to the previous figures.

At 302A, the kernel-level bridge component 122(2)(A) may detect an event (or data 204 associated with the event) on the kernel-level bus 120(2) of the kernel-level security agent 118 by virtue of the kernel-level bridge component 122(2)(A) being attached to the kernel-level bus 120(2). The data 204 associated with the event may have originated from a kernel-level component 122(2), such as the component 122(2)(B). In some embodiment, the determination at 302A may involve a determination of whether the event is to be sent to a user-level component 122(1), such as when the event satisfies one or more criteria. Alternatively, the data 204 originating from the component 122(2)(B) can indicate to the kernel-level bridge component 122(2)(A) that the data 204 is to be sent to a user-level component 122(1). In some cases, the data 204 associated with the event may further indicate a port identifier that is predetermined for communicating data 204 to a particular user-level component 122(1).

Unless and until an event is detected at 302A that is to be sent to a user-level component 122(1), the process 300A follows the "no" route from 302A and iterates until an event is detected. Upon detecting an event at 302A, the process 300A follows the "yes" route from 302A to block 304A where a communications port 206 is opened, as described herein. The port 206 can be used as a communication medium for sending data 204 associated with the event to a user-level endpoint component 122(1). At this point, because data 204 is to be communicated between a kernel-level component 122(2) and a user level component 122(1), the kernel-level component 122(2) from which the data 204 originated can be regarded as a first endpoint component 122, and the destination (or target) user-level component 122(1) that is to receive the data 204 can be regarded as a second endpoint component 122.

At 306A, the communications port 206 can be set to a connected state. At 308A, the data 204 can be serialized as serialized data to create a message 208, such as by translating the data 204 into a format that can be transmitted over the communications port 206. In some embodiments, the serialized data can include a message buffer having a starting address and a length, as described herein. It is to be appreciated that blocks 304A and 306A may be performed prior to the detection (or receipt) of an event(s) at 302A. In this scenario, an event may be detected after a communications port 206 is opened and set to a connected state.

At 310A, a message 208 can be sent via the opened and connected communications port 206. As mentioned above, and as described in more detail below, the sending of the message 208 at block 310A can be accomplished by activating at least one of a synchronous function or an asynchronous function. In the asynchronous case, the message 208 may be initially queued in a first thread context, and sent at block 310A in a second, different thread context.

At 312A, the message 208 (having been sent via the communications port 206 of the bridge component 104) is received by a component 122 in the user mode 202. The receiving component 122 can be the user-level bridge component 122(1)(A) and/or the receiving user-level endpoint component 122(1), such as the endpoint 122(1)(C) of FIG. 2.

Receiving the message 208 at block 312A can include calling a function by the user-level bridge component 122(1)(A) (or by the corresponding receiving endpoint 122(1)(C)), such as the following example Function (4), suitable for receiving incoming messages 208:

```
NTSTATUS
CsPortReceiveMessage (
    _in CS_PORT Port,
    _in_opt ULONG Timeout,                           (4)
    _out P_RECEIVED_MESSAGE Message,
    _out PCS_MESSAGE_ID MessageId
    );
```

In Function (4), "Port" is the port handle returned for Function (1) for the given port 206 over which the message 208 was sent; "Timeout" is a parameter that specifies how long the calling component 122(1) of Function (4) is willing to wait for an incoming message 208, measured in any suitable unit of time (e.g., milliseconds), where a timeout value of 0 can be considered valid and implies that the receive operation immediately returns "STATUS_TIMEOUT" if it turns out that the other endpoint 122(2) is not sending a message 208 at the moment; "Message" retrieves the context structure representing the received message 208; "MessageID" is populated with the message identifier of the received message 208. This unique message identifier would have been assigned by the sending endpoint's 122(2) call of the synchronous function or the asynchronous function for sending messages 208, and the message identifier can be used to match message contexts and request/reply semantics.

The call of Function (4), above, can return with multiple possible return codes including, without limitation, a "STATUS_SUCCESS" return code, a "STATUS_TIMEOUT" return code, or a "STATUS_CONNECTION_DISCONNECTED" return code. The "STATUS_SUCCESS" return code for Function (4) indicates that the message 208 was successfully received from the other endpoint 122(2) and copied to the provided message buffer. The "STATUS_TIMEOUT" return code for Function (4) indicates that the attempt to receive a message 208 timed out. The "STATUS_CONNECTION_DISCONNECTED" return code indicates that the port 206 was closed before the bridge component 122(1)(A) was able to receive a message 208 from the opposite endpoint 122(2)(B).

When receiving a message at block 312A by calling Function (4), the port 206 can provide a buffer pointer to the calling component (e.g., the bridge component 122(1)(A), or the corresponding endpoint 122(1)) by filling out the relevant fields in a particular received message data structure, such as the following example received message data structure:

```
typedef struct _RECEIVED_MESSAGE
{
    ULONG Version;
    ULONG Length;
    PVOID Buffer;
} RECEIVED_MESSAGE, *P_RECEIVED_MESSAGE;
```

The calling component may be configured to free the message buffer (or message context) at when the receiving endpoint 122(1) has received a Function (4) return code. This can be done as soon as possible to allow uninterrupted flow of incoming messages 208. When an incoming message 208 is received by calling Function (4), and a return code of Function (4) is received, the endpoint 122 can free the message context by calling the following example Function (5):

```
void
CsPortFreeReceivedMessage(
    _in CS_PORT Port,                        (5)
    _in P_RECEIVED_MESSAGE Message
    );
```

In Function (5), "Port" is the port handle returned by Function (1) for the port 206 over which the message 208 was received; and "Message" is the received message 208 from a previous call of Function (4). A call to Function (5) transfers ownership of the message 208 back to the bridge component 104. The endpoint 122 may be prevented from accessing any fields or memory of the message 208 after making this call to Function (5).

With continuing reference to the process 300A, at block 314A, the serialized data of the message 208 (e.g., the message buffer) can be deserialized to "unpack" the data 204 for consumption by the receiving endpoint component 122(1)(C).

At 316A, the data 204 associated with the event can be provided on the user-level bus 120(1) for consumption or reception by the receiving endpoint 122(1)(C) that is attached to the user-level bus 120(1).

Figure 3B:
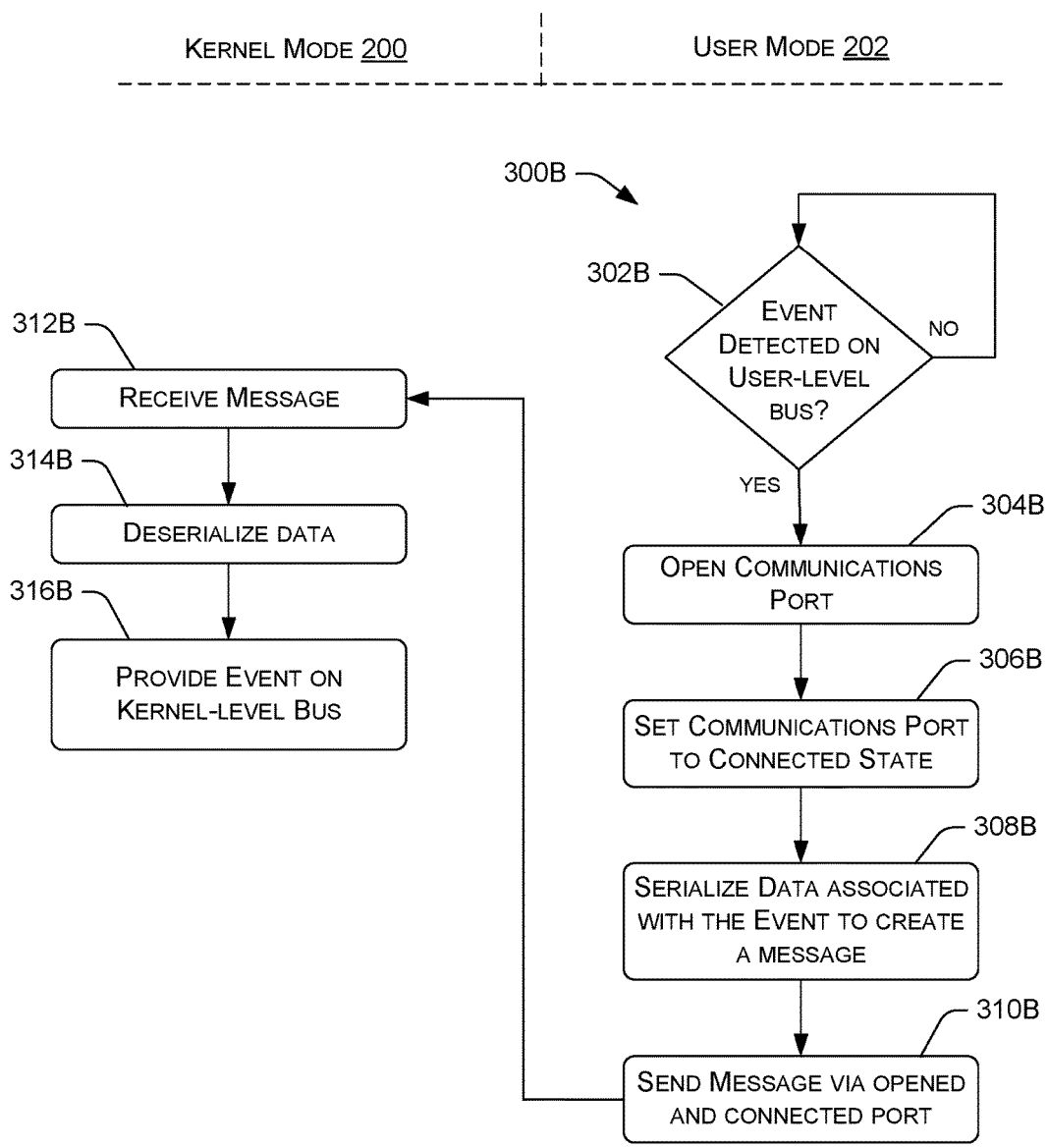
FIG. 3B illustrates example process for sending data between a kernel-level component and a user-level component in a direction from the user mode to the kernel mode.

FIG. 3B illustrates example process 300B for sending data 204 between a kernel-level component 122(2) and a user-level component 122(1) in a direction from the user mode 202 to the kernel mode 200. FIG. 3B is shown to illustrate the symmetric characteristic of the interface exposed by the bridge component 104 in that the operations of FIG. 3B can be similar to the operations of FIG. 3A, except that the direction of data 204 flow is in the opposite direction; from user mode 202 to kernel mode 200. Thus, blocks 302B-316B can be carried out in a similar fashion to that described with the corresponding blocks 302A-316A of the process 300A, recognizing that components involved are reversed from the perspective of the user mode-kernel mode demarcation. Therefore, the operations shown in FIG. 3B will not be described in more detail for the sake of brevity, as details of carrying out the operations 302B-316B can be understood by referring to the similar operations 302A-316A and reversing the components from the perspective of the user mode-kernel mode demarcation.

Figure 4:
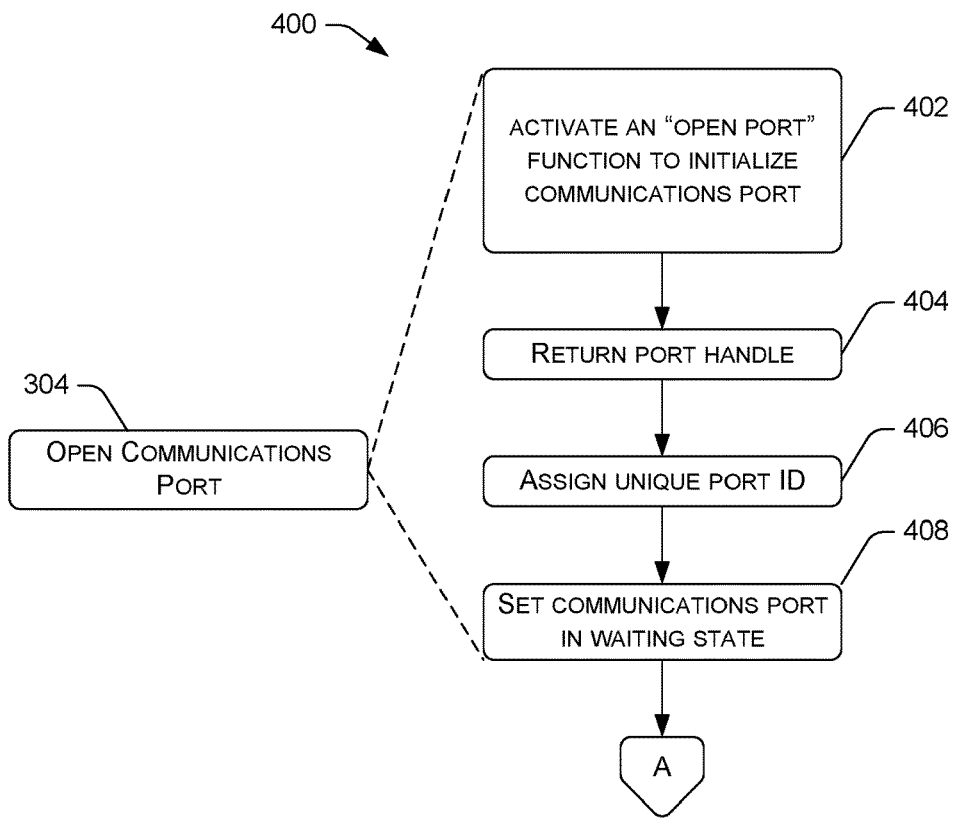
FIG. 4 illustrates an example process for opening a communications port, which can be performed by a user-level bridge component or a kernel-level bridge component.

FIG. 4 illustrates an example process 400 for opening a communications port 206, which can be performed by a user-level bridge component 122(1)(A) (or a corresponding user-level endpoint 122(1)) or by a kernel-level bridge component 122(2)(A) (or a corresponding kernel-level endpoint 122(2)). As indicated in FIG. 4, the process 400 may represent a sub-process performed at block 304 (i.e., blocks 304A or 304B) of the processes 300A or 300B.

At 402, a function to open a port 206 can be activated by calling the function, and to initialize the port 206. The activation of the function to open the port 206 at block 402 can be performed from either side of the user mode-kernel mode demarcation, depending on which component loads first and/or where an event is detected first. For example, the kernel-level bridge component 122(2)(A) (or a corresponding kernel-level endpoint 122(2)) can call the "open port"

function to activate the function and to initialize the port in the kernel mode 200, or the user-level bridge component 122(1)(A) (or a corresponding user-level endpoint 122(1)) can do the same at block 402. For purposes of describing the process 400, assume that the port 206 is initialized by a kernel-level component 122 in the kernel mode 200 at block 402. An example function that can be activated at block 402 includes Function (1).

At 404, a port handle can be returned for the port 206, which can be used for sending the message 208 when calling a send message function. For instance, the port handle can be returned when activating Function (1), as described in more detail above.

At 406, a unique port identifier can be assigned to the port 206. As described herein, the port identifier may be predetermined by the pair of endpoints 122 that are to communicate over the port 206 in question, and may uniquely identify the port 206 by differentiating the port 206 from other communications ports 206 that have been opened on the computing device 102, as described herein. It is to be appreciated that block 406 may be performed prior to the performance of blocks 402 and 404, such as when the unique port identifier is determined as an input to the "open port" function activated at block 402.

At 408, the communications port 206 can be set to a waiting state (or an opened and disconnected state) until the user-level bridge component 122(1)(A) in the user-mode 202 activates the "open port" function, such as Function (1).

Figure 5:
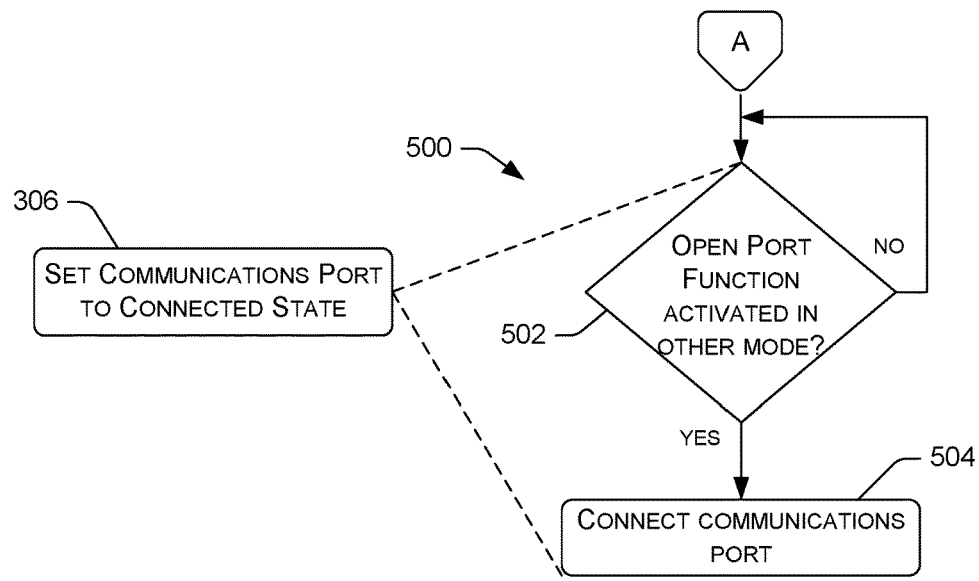
FIG. 5 illustrates an example process for setting a communications port into a connected state, which can be performed by a user-level bridge component or a kernel-level bridge component.

FIG. 5 illustrates an example process 500 for setting a communications port 206 into a connected state, which can be performed by a user-level bridge component 122(1)(A) (or a corresponding user-level endpoint 122(1)) or by a kernel-level bridge component 122(2)(A) (or a corresponding kernel-level endpoint 122(2)). As shown by the reference "A" in FIGS. 4 and 5, the process 500 can continue from block 408 of the process 400, after a port 206 has been opened from one side of the user mode-kernel mode demarcation. Furthermore, as shown in FIG. 5, the process 500 may represent a sub-process of block 306 (i.e., blocks 306A or 306B) of the processes 300A or 300B.

At 502, a determination is made as to whether an "open port" function has been activated in the user mode 202 in response to the port 206 having been opened in kernel mode 200 (or vice versa). If not, the process 500 follows the "no" route from 502 to iterate until a user-mode component 122 activates the "open port" function, such as Function (1). This may activate a callback function, such as the aforementioned "ConnectCallback" function to notify the kernel-mode component that the port 206 has been opened (e.g., by activating Function (1)) from the user mode 202. In this case, the process 500 follows the "yes" route from 502 to block 504, where the port 206 is set to the connected state, and messages 208 can be passed across the user mode-kernel mode demarcation via the connected port 206.

Figure 6:
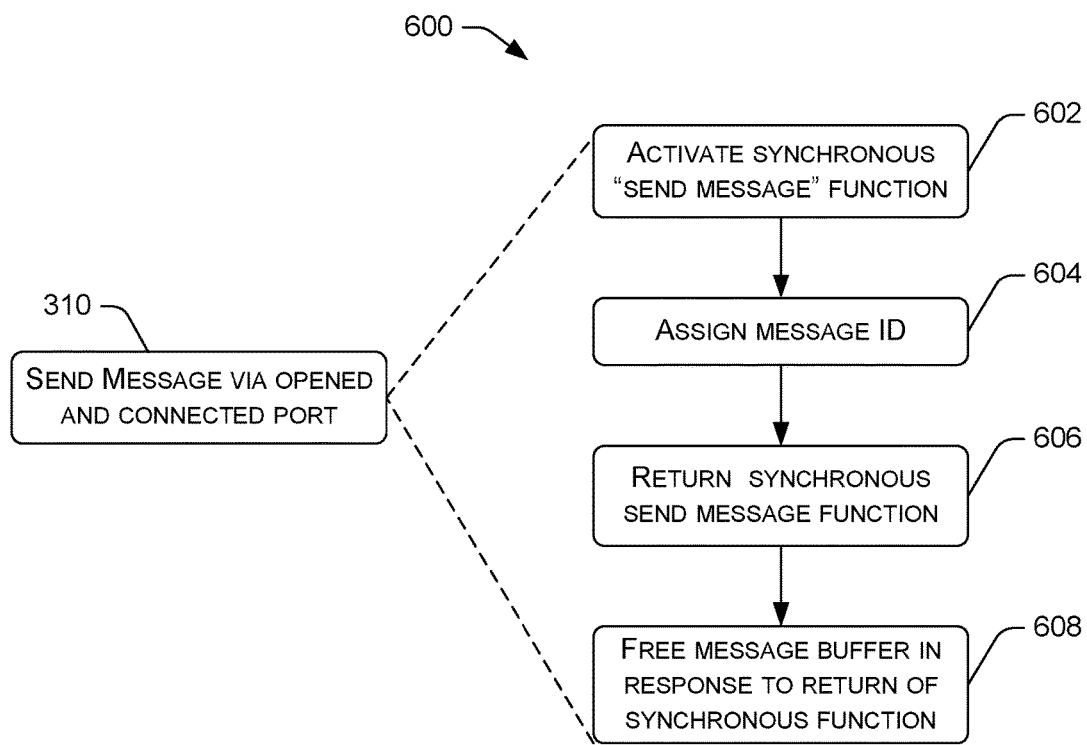
FIG. 6 illustrates an example process for sending a message synchronously.

FIG. 6 illustrates an example process 600 for sending a message 208 synchronously. As shown in FIG. 6, the process 600 may represent a sub-process of block 310 (i.e., blocks 310A or 310B) of the processes 300A or 300B for sending a message 208 via an opened and connected port 206.

At 602, a synchronous function can be activated for sending a message 208. As reiterated herein, this can occur from either side of the user mode-kernel mode demarcation. For exemplary purposes, assume that the activation of the synchronous function at block 602 stems from a kernel-level component, such as the kernel-level bridge component 122(2)(A) or a kernel-level endpoint 122(2) utilizing the kernel-level bridge component 122(2)(A). An example synchronous function for sending messages 208 is shown below as Function (6):

```
NTSTATUS
CsPortSendMessage (                                    (6)
    _in CS_PORT Port,
    _in PVOID MessageBuffer,
    _in ULONG MessageLength,
    _in_opt ULONG Timeout,
    _out_opt PCS_MESSAGE_ID MessageId
);
```

In synchronous Function (6), "Port" is an initialized (opened, but not necessarily connected) port 206; "MessageBuffer" defines or specifies the starting address of the message buffer to be sent, which includes both the header space and the payload; "MessageLength" defines or specifies the length of the total message buffer (header space+ payload); "Timeout" is a parameter indicating how long the calling component 122 is willing to wait for the delivery, in any suitable unit of time (e.g., milliseconds), where a value 0 can be a valid value, and a value of 0 meaning that the send operation will succeed in the exclusive case where a thread on the receiver side is already waiting for an incoming message 208; and "MessageID" returns the message identifier for the message 208.

Thus, at 604, a message identifier can be assigned to the message 208. For instance, this can be returned as the "MessageID" for a call of Function (6). It is to be appreciated that the message identifier assigned at block 604 doesn't necessarily imply a sequence order with respect to other simultaneous operations on the port 206, as described herein.

At 606, the call of the synchronous function can be returned. For example, the call of Function (6), above, can return with multiple possible return codes including, without limitation, a "STATUS_SUCCESS" return code, a "STATUS_CONNECTION_DISCONNECTED" return code, and an error code, the error code being returned in all other cases besides the "STATUS_SUCCESS" return code and the "STATUS_CONNECTION_DISCONNECTED" return code. The "STATUS_SUCCESS" return code indicates that the message 208 and data 204 were successfully sent. The "STATUS_CONNECTION_DISCONNECTED" return code indicates that the message 208 was attempted over a disconnected port 206.

At 608, in response to the call of the synchronous function returning at block 606 (e.g., a return code is received by the calling component 122(2) indicating that the message 208 is successfully sent, a timeout occurred before the message 208 could be sent, or the message 208 failed to send), the message buffer can be freed. In other words, the message buffer (as specified by "MessageBuffer" and "MessageLength" in the synchronous Function (6)) of the message 208 can remain valid and unchanged at least until the call of the synchronous function returns with one of the above status indicators at block 606.

The synchronous send message function (e.g., Function (6)) attempts to send the message 208 synchronously, in the context of the calling component 122(2). Thus it is possible for the execution of the thread executing this message send operation to be blocked. In some configurations, it may not be possible to cancel the sending of a message 208 using the synchronous function, such as Function (6).

Figure 7:
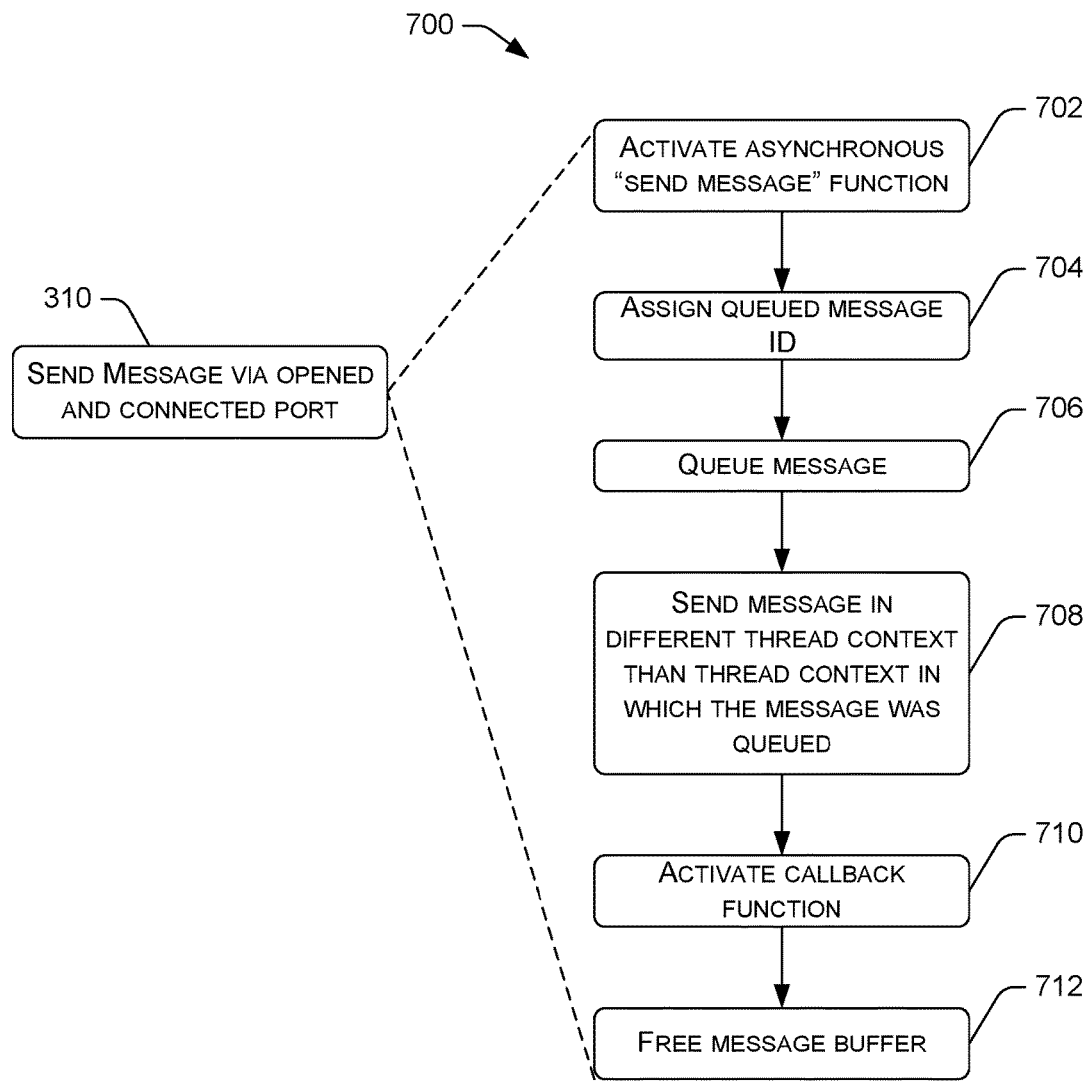
FIG. 7 illustrates an example process for sending a message asynchronously.

FIG. 7 illustrates an example process 700 for sending a message 208 asynchronously. As shown in FIG. 7, the process 700 may represent a sub-process of block 310 (i.e., blocks 310A or 310B) of the processes 300A or 300B for sending a message 208 via an opened and connected port 206.

At 702, an asynchronous function can be activated for sending a message 208. This asynchronous function provides a non-blocking send operation alternative to the synchronous function for sending messages 208 described in FIG. 6. As reiterated herein, the activation of the asynchronous function can occur from either side of the user mode-kernel mode demarcation. For exemplary purposes, assume that the activation of the asynchronous function at block 702 stems from a kernel-level component, such as the kernel-level bridge component 122(2)(A) or a kernel-level endpoint 122(2) utilizing the kernel-level bridge component 122(2)(A). An example asynchronous function for sending messages 208 is shown below as Function (7):

```
NTSTATUS
CsPortQueueMessage (
    _in CS_PORT Port,
    _in_opt ULONG_PTR MessageContext,
    _in PVOID MessageBuffer,
    _in ULONG MessageLength,
    _in_opt ULONG Timeout,
    _in CS_QUEUED_MESSAGE_ID QueuedMessageId
);                                                          (7)
```

In asynchronous Function (7), "Port" is an initialized (opened, but not necessarily connected) port 206; "MessageContext" is an optional message context associated with the invocation of Function (7); "MessageBuffer" defines or specifies the starting address of the message buffer to be sent, which includes both the header space and the payload; "MessageLength" defines or specifies the length of the total message buffer (header space+payload); "Timeout" is a parameter indicating how long the calling component 122 is willing to wait for the delivery upon the dispatch of the message 208, in any suitable unit of time (e.g., milliseconds), where a value 0 can be a valid value, and a value of 0 implies that the send operation will be activated with a timeout of 0 milliseconds; "QueuedMessageID" is the pre-allocated queued message identifier assigned for the given message 208 (which is not the same as the message identifier that can be assigned when the message 208 is actually delivered), which can be used to correlate the message context with its "MessageSentCallback" invocation, or to cancel the queued message 208. It is to be appreciated that the "Timeout" parameter may not be evaluated or proactively enforced while the message 208 is waiting in the queue. For example, a message 208 with Timeout of 3 seconds that takes 5 seconds to reach the head of the queue can be cancelled in response to the message 208 reaching the head of the queue after 5 seconds, rather than being cancelled before the message 208 reaches the head of the queue. A "MessageSentCallback" can be called at this time with "SentStatus" set to "STATUS_TIMEOUT."

Thus, at 704, a queued message identifier can be assigned to the message 208. For instance, this can be returned as the "QueuedMessageID" for a call of Function (7). It is to be appreciated that the assignment of a queued message identifier at block 704 may be performed prior to the activation of the asynchronous function at block 702, such as when the queued message identifier is determined as an input of the asynchronous Function (7). In the asynchronous message 208 send scenario, a valid, unique "QueuedMessageId" value is to be specified in asynchronous Function (7) for the message 208 that is sent. The queued message identifier can be generated using the following Function (8):

```
CS_QUEUED_MESSAGE_ID
CsPortGetUniqueQueuedMessageId (
    _in CS_PORT Port
);                                                          (8)
```

In Function (8), "Port" is the port handle returned by Function (1) (the "open port" function). Function (8) is configured to return the next available queued message identifier, which is unique, as described herein.

At 706, the message 208 with the queued message identifier can be queued. At 708, the message 208 can be sent in a different thread context than a thread context in which the message was queued at block 706. In other words, the asynchronous message send function (e.g., Function (7)) queues the message 208 first, and then attempts to send the message 208 in a different thread context as necessary to avoid blocking. Thus the execution of the current thread is not blocked. It is to be appreciated that queued messages 208 may not be delivered in the order that they are queued.

At 710, the "MessageSentCallback" callback previously provided as input to the "open port" function (e.g., Function (1)) can be called with the "MessageContext" from the activation of the asynchronous send message function (e.g., Function (7)). If the activation of the asynchronous Function (7) succeeds, the callback is activated/invoked at some point in time at block 710. Due to the asynchronous nature of the involved operations, the message 208 might be sent, and the corresponding "MessageSentCallback" may be invoked before the asynchronous Function (7) invocation returns. An example callback function activated at block 710 is shown below as Function (9):

```
typedef
VOID
(*PCS_MESSAGE_SENT_CALLBACK) (
    _in CS_PORT Port,
    _in_opt ULONG_PTR PortContext,
    _in_opt ULONG_PTR MessageContext,
    _in NTSTATUS SentStatus,
    _in PVOID MessageBuffer,
    _in ULONG MessageLength,
    _in CS_MESSAGE_ID MessageId,
    _in CS_QUEUED_MESSAGE_ID QueuedMessageId
);                                                          (9)
```

In Function (9), "Port" is the port handle returned by Function (1); "PortContext" is an optional port context provided during the port initialization; "MessageContext" is an optional context provided by the calling component 122; and "SentStatus" is an operational status indicating a result including, without limitation, a "STATUS_SUCCESS" result indicating the messages was successfully delivered to the other endpoint component 122(1), a "STATUS_TIMEOUT" result indicating that the attempt to send this message 208 timed out, a "STATUS_CONNECTION_DISCONNECTED" result indicating that the port 206 was closed before the bridge component 104 was able to send the message 204 to the opposite endpoint 122(1), or a "STATUS_CANCELLED" result indicated that the sending of a queued message 208 was explicitly cancelled before it was sent. In Function (9), "MessageBuffer" and "MessageLength" are parameters that define or specify the message 208 to be sent; "MessageID" is the unique message identifier assigned when the message 208 was actually sent using asynchronous Function (7); and "QueuedMessageID" is the unique queued message identifier provided by the calling component 122(2) of the asynchronous Function (7).

The call of Function (7), above, can return with multiple possible return codes including, without limitation, a "STATUS_SUCCESS" return code, a "STATUS_CONNECTION_DISCONNECTED" return code, and an error code, the error code being returned in all other cases besides the "STATUS_SUCCESS" return code and the "STATUS_CONNECTION_DISCONNECTED" return code. The "STATUS_SUCCESS" return code indicates that the message 208 and data 204 were successfully sent. The "STATUS_CONNECTION_DISCONNECTED" return code indicates that the message 208 was attempted over a disconnected port 206.

At 712, in response to callback being called and activated at block 710, the message buffer can be freed. Thus, the lifetime of the message buffer of the sending endpoint 122 in the asynchronous message send scenario can extend at least until a "MessageSentCallback" is called and activated at block 710 with a queued message identifier corresponding to the message 208 in question. This "MessageSentCallback" can be activated at block 710 when the message 208 is successfully sent, a timeout occurs before the message 208 can be sent, or the message 208 failed to send (e.g., if the port 206 is in the disconnected state during the attempt to send the message 208).

It is to be appreciated that a queued message 208 can be cancelled by calling a message cancellation function, such as the example Function (10), shown below:

```
NTSTATUS
CsPortCancelMessage (
    _in CS_PORT Port,
    _in CS_QUEUED_MESSAGE_ID QueuedMessageId
);                                                              (10)
```

In Function (10), "Port" is the port handle returned by Function (1); and "QueuedMessageID" is the unique queued message identifier assigned to the message 208 to be cancelled. The queued message identifier was assigned by the calling component 122(2) of the asynchronous Function (7), such as by calling the Function (8).

The call of Function (10), above, can return with multiple possible return codes including, without limitation, a "STATUS_SUCCESS" return code, and a "STATUS_UNSUCCESSFUL" return code. The "STATUS_SUCCESS" return code indicates that the message 208 was removed from the internal queue and it was not delivered to the other endpoint 122(1). IT is to be appreciated that the "MessageSentCallback" can be called in this case with the "SentStatus" parameter set to "STATUS_CANCELLED." The "STATUS_UNSUCCESSFUL" return code indicates that the queued message identifier was not found and thus couldn't be cancelled. At this point the message 208 was either already delivered to the other endpoint 122(1), already cancelled, or the delivery will be attempted soon.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
at least one processor;
memory storing computer-executable instructions that, when executed by the at least one processor, cause the system to implement a symmetric bridge component partially in a user mode of the system and partially in a kernel mode of the system, wherein the symmetric bridge component is configured to cause the system to:
  open a communications port by causing a first bridge component, of the symmetric bridge component, to activate a function to initialize the communications port in one of the kernel mode or the user mode;
  set the communications port to a connected state to create an opened and connected communications port in response to a second bridge component, of the symmetric bridge component, activating the function in the other of the kernel mode or the user mode;
  send a message containing data via the opened and connected communications port, the data originating from a first endpoint component executable in one of the kernel mode or the user mode; and
  receive the data at a second endpoint component executable in the other of the kernel mode or the user mode.

2. The system of claim 1, wherein the communications port is set to a waiting state in response to activation of the function by the first bridge component and until the second bridge component activates the function.

3. The system of claim 1, wherein:
opening the communications port further comprises returning a port handle for the communications port; and
sending the message is based at least in part on the port handle.

4. The system of claim 1, wherein opening the communications port further comprises assigning a port identifier to the communications port that uniquely identifies the communications port by differentiating the communications port from other communications ports that have been opened on the system.

5. The system of claim 1, wherein the symmetric bridge component comprises at least one common application programming interface (API) for communication of the data between the kernel mode and the user mode in both directions.

6. The system of claim 1, wherein:
the first endpoint component is attached to at least one of: (i) a kernel-level bus of a kernel-level security agent executing in the kernel mode, or (ii) a user-level bus of a user-level security agent executing in the user mode; and
the second endpoint component is attached to the other of the kernel-level bus or the user-level bus.

7. A method comprising:
opening a communications port by causing a first bridge component to activate a function to initialize the communications port in one of a kernel mode of a computing device or a user mode of the computing device;
setting the communications port to a connected state in response to a second bridge component activating the function in the other of the kernel mode or the user mode;

in response to opening the communications port and setting the communications port to the connected state, sending a message containing data via the communications port, the data originating from a first endpoint component executable in one of the kernel mode or the user mode; and receiving the data at a second endpoint component executable in the other of the kernel mode or the user mode.

8. The method of claim 7, further comprising, prior to sending the message via the communications port:

serializing the data as serialized data; and creating the message based at least in part on the serialized data.

9. The method of claim 8, wherein:

the function is a first function;

the serialized data comprises a message buffer having a starting address and a length; and sending the message comprises activating a second function that specifies the starting address and the length of the message buffer.

10. The method of claim 9, wherein:

the second function comprises a synchronous function; and the message buffer remains valid and unchanged at least until a call to the synchronous function is returned with at least one of an indication that the message was successfully sent, an indication that a timeout occurred, or an indication that the message failed to send.

11. The method of claim 9, wherein:

the second function comprises an asynchronous function; and the message buffer remains valid and unchanged at least until a callback function is activated in response to at least one of the message being successfully sent, a timeout occurring, or the message failing to send.

12. The method of claim 11, wherein sending the message comprises:

queuing the message; and sending the message in a different thread context than a thread context in which the message was queued.

13. The method of claim 8, further comprising, prior to receiving the data at the second endpoint component:

deserializing the serialized data to obtain the data; and providing the data to at least one of: (i) a kernel-level component instantiated in the kernel mode, or (ii) a user-level component instantiated in the user mode.

14. The method of claim 7, wherein:

the first endpoint component is attached to at least one of: (i) a kernel-level bus of a kernel-level security agent executing in the kernel mode, or (ii) a user-level bus of a user-level security agent executing in the user mode; and the second endpoint component is attached to the other of the kernel-level bus or the user-level bus.

15. The method of claim 7, wherein the first bridge component and the second bridge component are each part of a symmetric bridge component that is implemented partially in the user mode and partially in the kernel mode and that comprises at least one common application programming interface (API) for communication of the data between the kernel mode and the user mode in both directions.

16. The method of claim 7, further comprising setting the communications port to a waiting state in response to activation of the function by the first bridge component and until the second bridge component activates the function.

17. One or more non-transitory computer-readable media storing computer-executable instructions configured to implement a symmetric bridge component for sending data between a kernel mode of a computing device and a user mode of the computing device, the symmetric bridge component performing operations comprising:

opening a communications port by causing a first bridge component, of the symmetric bridge component, to activate a function to initialize the communications port in one of the kernel mode or the user mode;

setting the communications port to a connected state in response to a second bridge component, of the symmetric bridge component, activating the function in the other of the kernel mode or the user mode; and in response to opening the communications port and setting the communications port to the connected state, sending a message containing the data via the communications port, the data originating from a first endpoint component executable in one of the kernel mode or the user mode, and the data received at a second endpoint component executable in the other of the kernel mode or the user mode.

18. The one or more non-transitory computer-readable media of claim 17, wherein:

opening the communications port further comprises returning a port handle for the communications port; and sending the message is based at least in part on the port handle.

19. The one or more non-transitory computer-readable media of claim 17, wherein opening the communications port further comprises assigning a port identifier to the communications port that uniquely identifies the communications port by differentiating the communications port from other communications ports that have been opened on the computing device.

20. The one or more non-transitory computer-readable media of claim 17, wherein the symmetric bridge component comprises at least one common application programming interface (API) for communication of the data between the kernel mode and the user mode in both directions.

21. The one or more non-transitory computer-readable media of claim 17, wherein the communications port is set to a waiting state in response to activation of the function by the first bridge component and until the second bridge component activates the function.

\* \* \* \* \*